US012617950B2

(12) United States Patent
Farrugia et al.

(10) Patent No.: US 12,617,950 B2
(45) Date of Patent: May 5, 2026

(54) POLYMER PARTICLES COMPRISING LIGNIN AND RELATED ADDITIVE MANUFACTURING METHODS

(71) Applicant: Xerox Corporation, Norwalk, CT (US)

(72) Inventors: Valerie M. Farrugia, Oakville (CA); Shivanthi Easwari Sriskandha, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 987 days.

(21) Appl. No.: 17/512,364

(22) Filed: Oct. 27, 2021

(65) Prior Publication Data

US 2023/0130097 A1    Apr. 27, 2023

(51) Int. Cl.
| | |
|---|---|
| *C09D 7/65* | (2018.01) |
| *B29C 64/153* | (2017.01) |
| *B33Y 70/00* | (2020.01) |
| *C08L 97/00* | (2006.01) |
| *C09D 5/03* | (2006.01) |
| *C09D 183/04* | (2006.01) |
| *B29K 83/00* | (2006.01) |

(52) U.S. Cl.
CPC .............. *C09D 7/65* (2018.01); *B29C 64/153* (2017.08); *B33Y 70/00* (2014.12); *C08L 97/005* (2013.01); *C09D 5/031* (2013.01); *C09D 5/036* (2013.01); *C09D 183/04* (2013.01); *B29K 2083/00* (2013.01); *B29K 2093/00* (2013.01)

(58) Field of Classification Search
CPC .............................. B33Y 70/00; C08L 97/005
See application file for complete search history.

(56) References Cited

U.S. PATENT DOCUMENTS

| | | | | |
|---|---|---|---|---|
| 9,523,934 | B2 * | 12/2016 | Orrock ................... | G03G 15/08 |
| 9,815,985 | B2 | 11/2017 | Naskar et al. | |
| 10,851,245 | B2 | 12/2020 | Samec et al. | |
| 2019/0225809 | A1 | 7/2019 | Naskar et al. | |
| 2020/0308330 | A1 * | 10/2020 | Veregin ..................... | B29B 9/16 |
| 2020/0308411 | A1 | 10/2020 | Naskar et al. | |
| 2020/0369888 | A1 | 11/2020 | Kam et al. | |
| 2021/0040273 | A1 | 2/2021 | Laleg et al. | |
| 2021/0069958 | A1 | 3/2021 | Farrugia et al. | |
| 2021/0070936 | A1 | 3/2021 | Farrugia et al. | |
| 2021/0171764 | A1 | 6/2021 | Obielodan et al. | |

FOREIGN PATENT DOCUMENTS

WO    2020109671    6/2020

OTHER PUBLICATIONS

Shayeteh Haghdan, et al. Sources of Lignin, Lignin in Polymer Composites, William Andrew Publishing, 2016, pp. 1-11.
Osbert Yu, et al. Lignin to Materials: A Focused Review on Recent Novel Lignin Applications, Appl. Sci. 2020, 10, 4626.
M. Toumela, et al. Biodegradation of lignin in a compost environment: a review, Biores. Tech. 2000, 72, pp. 169-183.
Chemical Modification of Lignin, Chapter 3, Lignin Chemistry and Applications, Chemical Industry Press, 2019, pp. 51-78.
Goran Gellerstedt, et al. Lignins: Major Sources, Structure and Properties, Monomers, Polymers and Composites from Renewable Resources, Chapter 9, 2008, pp. 201-224.
Grzegorz Janusz, et al. Lignin degradation: microorganisms, enzymes involved, genomes analysis and evolution, FEMS Microbio. Rev. 41, 2017, 941-962.
Aditi Nagardeolekar, et al. Prospects and Challenges of Using Lignin for Thermoplastic Materials, Lignin Utilization Strategies: From Processing to Applications ACS Symposium Series; American Chemical Society: Washington, DC, 2021.
DS Bajwa, et al. A consise review of current lignin production, applications, products and their environmental impact, Ind. Crop Prod. 2019, 139, 111526.
Ngoc A Nguyen et al., A path for lignin valorization via additive manufacturing of high-performance sustainable composites with enhanced 3D printability, Sci. Adv. 2018, 4, 10.
Rubina Ajdary, et al. Selective Laser Sintering of Lignin-Based Composites, ACS Sustainable Chem. Eng. 2021, 9, 2727-2735.
Monika Osterberg, et al. Spherical lignin particles: a review on their sustainability and applications, Green Chem., 2020, 22, 2712-2733.
T Shah, et al. Extraordinary toughening and strengthening effect in polymer nanocomposites using ligninbased fillers synthesized by ATRP. Polymer (Guildf) 2015, 72:406-412.

* cited by examiner

*Primary Examiner* — Vickey Nerangis

(74) *Attorney, Agent, or Firm* — Vorys, Sater, Seymour and Pease LLP

(57) ABSTRACT

Thermoplastic polymer particles suitable for use in additive manufacturing and related methods may comprise lignin. For example, said polymer particles may comprise a thermoplastic polymer, a lignin, optionally an emulsion stabilizer, and optionally a compatibilizer. Said polymer particles may be produced by melt emulsification methods and be highly spherical and, consequently, suited for selective laser sintering methods of additive manufacturing.

14 Claims, 6 Drawing Sheets

POLYMER PARTICLES COMPRISING LIGNIN AND RELATED ADDITIVE MANUFACTURING METHODS

FIELD OF INVENTION

The present disclosure relates to polymer particles suitable for use in additive manufacturing and related methods.

BACKGROUND

Lignin is a renewable feedstock and is also the second most abundant biopolymer on earth. This polyphenolic fiber provides plants with their rigidity. The worldwide generation of lignin is beyond 100 million dry tons/year as a by-product of pulp and paper-making. The price of lignin ranges from 200 to 500 USD/dry ton. Compared to polyethylene which is well over 1000 USD/dry ton, lignin is inexpensive and vastly available.

Researchers from both academia and industry are testing the feasibility of incorporating lignin with conventional polymers, such as nylon or polyamides to create composite materials, mainly for fused filament fabrication (FFF) methods of three-dimensional (3-D) printing, also known as additive manufacturing. However, FFF methods generally require a material (e.g., a polymeric material) that can be easily extruded and has excellent weld strength between layers along with outstanding mechanical properties. However, lignin can only be heated to about 200° C. before lignin starts to decompose, while the softening temperature of lignin is around 100° C. Further, if the temperature of the lignin becomes too high or lignin is exposed to heat for too long, the lignin viscosity will increase beyond the ability to properly flow. Therefore, there is a narrow operating window with temperature and processing time limitations for implementing lignin in additive manufacturing.

Selective laser sintering (SLS) is a type of known as additive manufacturing that produces plastic parts by using a laser to sinter consecutive layers of polymeric powder. Because of operating limitations of lignin for blending with other polymers, research in SLS powders has been limited to admixture of lignin particles and particles of other polymers like nylon. While objects have been successfully printed, the composition of the objects includes portions of lignin fused to portions of the other polymer, which, in effect, may introduce grain boundaries. Therefore, the mechanical properties of the object may be more dependent on how well the lignin particles fuse to the other polymer particles to a greater extent than the mechanical properties of the lignin and other polymer.

SUMMARY OF INVENTION

The present disclosure relates to polymer particles that comprise a thermoplastic polymer and lignin and that are suitable for use in additive manufacturing and related methods where warping in additive manufacturing methods like SLS may be mitigated.

Disclosed herein are methods that comprise: mixing a mixture comprising: a thermoplastic polymer, a lignin, a carrier fluid, and optionally an emulsion stabilizer at a temperature at or greater than a melting point or softening temperature of the thermoplastic polymer to emulsify a thermoplastic polymer melt in the carrier fluid; cooling the mixture to below the melting point or softening temperature to form polymer particles; and separating the polymer particles from the carrier fluid, wherein the polymer particles comprise the thermoplastic polymer, the lignin, the emulsion stabilizer, if included.

Further disclosed herein are compositions that comprise: polymer particles comprising a thermoplastic polymer, a lignin, optionally an emulsion stabilizer, and optionally a compatibilizer.

Disclosed herein are methods that comprise: depositing first polymer particles and optionally second polymer particles different than the first particles onto a surface, wherein the first polymer particles comprising a thermoplastic polymer, a lignin, optionally an emulsion stabilizer, and optionally a compatibilizer; and once deposited, exposing at least a portion of the first and second particles, when included, to a laser to fuse the first and second particles, when included, and form a consolidated body.

Further disclosed herein are selective laser sintered articles comprising polymer particles sintered together, wherein the polymer particles comprise first polymer particles comprising a thermoplastic polymer, a lignin, optionally an emulsion stabilizer, and optionally a compatibilizer.

BRIEF DESCRIPTION OF THE DRAWINGS

The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Figure 1:
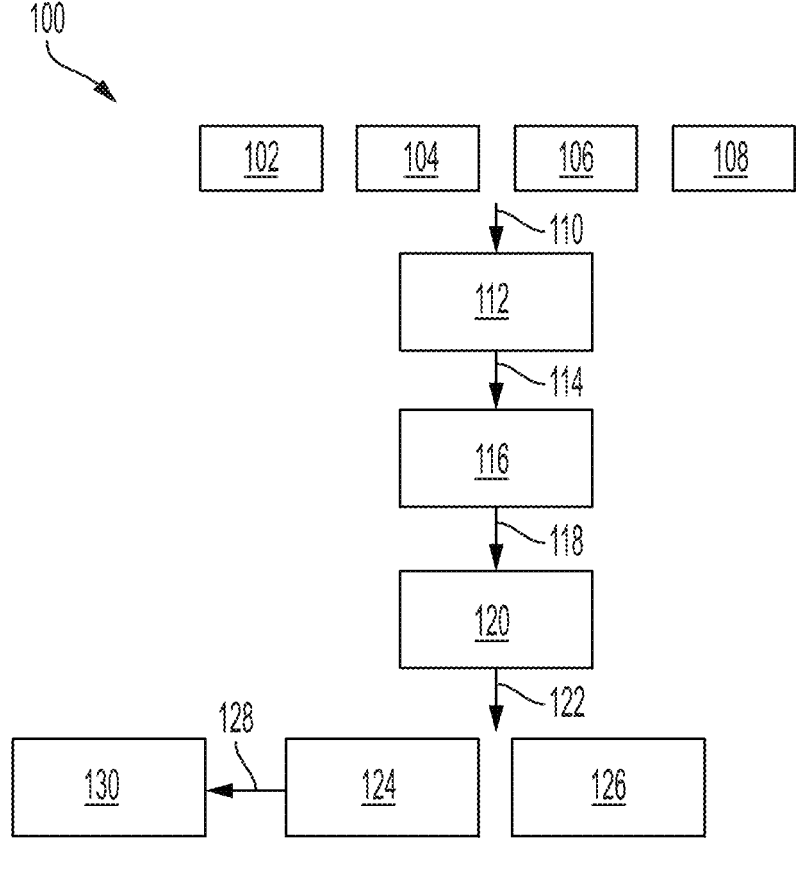
FIG. 1 is a flow chart of a nonlimiting example method 100 of the present disclosure.

The present disclosure relates to thermoplastic polymer particles suitable for use in additive manufacturing and related methods. More specifically, the present disclosure includes polymer particles that are highly spherical and comprise a thermoplastic polymer and lignin. Advantageously, lignin is an abundant, low-cost, bio-based polymer. Consequently, replacing a portion of thermoplastic polymer with lignin may reduce the cost of the raw material for the production of the polymer particles. Further, being a bio-based polymer that can be sourced from a variety of plants, the inclusion of lignin may increase the renewable fraction of the polymer particles and, consequently, objects produced therefrom.

The chemical and physical properties of lignin depend, to some extent, on the source of the lignin and the extraction method from said source. Accordingly, lignin may be used to tailor the properties of the polymer particles and, consequently, objects produced therefrom based on the properties of the lignin. For example, lignin may impart one or more of: flame retardant properties, antimicrobial properties, UV blocking properties, mechanical strength, thermal stability, and the like. Additionally, lignin, depending on the source, is generally not hydrolysable, which may allow for lignin to replace thermoplastic polymers like polyolefins without significant changes in chemical resistance.

In some instances, for example in the presence of certain fungi like white rot and brown rot, lignin may be, to some extent, biodegradable. When the waste may come in contact with organism and/or conditions of lignin biodegradability, objects produced with lignin and another biodegradable, thermoplastic polymer like a polyester may be suitably biodegradable.

Definitions and Test Methods

Numerical ranges used herein include the numbers recited in the range. For example, the numerical range "from 1 wt % to 10 wt %" includes 1 wt % and 10 wt % within the recited range.

As used herein, the term "immiscible" refers to a mixture of components that, when combined, form two or more phases that have less than 5 wt % solubility in each other at ambient pressure and at room temperature or the melting point of the component if it is solid at room temperature. For example, polyethylene oxide having 10,000 g/mol molecular weight is a solid room temperature and has a melting point of 65° C. Therefore, said polyethylene oxide is immiscible with a material that is liquid at room temperature if said material and said polyethylene oxide have less than 5 wt % solubility in each other at 65° C.

A "polymer" has two or more of the same or different mer units. A "homopolymer" is a polymer having mer units that are the same. The term "polymer" as used herein includes, but is not limited to, homopolymers, copolymers, terpolymers, etc. The term "polymer" as used herein also includes impact, block, graft, random, and alternating copolymers. The term "polymer" shall further include all possible geometrical configurations unless otherwise specifically stated. Such configurations may include isotactic, syndiotactic, and random symmetries.

As used herein, the term "thermoplastic polymer" refers to a plastic polymer material that softens and hardens reversibly on heating and cooling. Thermoplastic polymers encompass thermoplastic elastomers.

As used herein, the term "elastomer" refers to a copolymer comprising a crystalline "hard" section and an amorphous "soft" section. In the case of a polyurethane, the crystalline section may include a portion of the polyurethane comprising the urethane functionality and optional chain extender group, and the soft section may include the polyol, for instance.

As used herein, the term "oxide" refers to both metal oxides and non-metal oxides. For purposes of the present disclosure, silicon is considered to be a metal.

An "olefin," alternatively referred to as "alkene," is a linear, branched, or cyclic compound of carbon and hydrogen having at least one double bond. Further, when a polymer is referred to as "comprising an olefin" or as a "polyolefin," the olefin present in the polymer is the polymerized form of the olefin.

As used herein, when a polymer is referred to as "comprising, consisting of, or consisting essentially of" a monomer, the monomer is present in the polymer in the polymerized form of the monomer or is the derivative form of the monomer. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer.

As used herein, the term "embed" relative to particles (e.g., nanoparticles) and a surface of a polymer particle refers to the particle being at least partially extending into the surface of the polymer particle such that polymer is in contact with the nanoparticle to a greater degree than would be if the nanoparticle were simply laid on the surface of the polymer particle.

Herein, D10, D50, D90, and diameter span are primarily used herein to describe particle sizes. As used herein, the term "D10" refers to a diameter below which 10% (on a volume-based distribution, unless otherwise specified) of the particle population is found. As used herein, the terms "D50," "average particle diameter," and "average particle size" refers to a diameter below which 50% (on a volume-based median average, unless otherwise specified) of the particle population is found. As used herein, the term "D90" refers to a diameter below which 90% (on a volume-based distribution, unless otherwise specified) of the particle population is found. As used herein, the terms "diameter span" and "span" and "span size" when referring to diameter provides an indication of the breadth of the particle size distribution and is calculated as (D90–D10)/D50.

Particle diameters and particle size distributions are determined by light-scattering techniques using a Malvern MASTERSIZER™ 3000. For light-scattering techniques, the control samples were glass beads with a diameter within the range of 15 m to 150 m under the tradename Quality Audit Standards QAS4002™ obtained from Malvern Analytical Ltd. Samples were analyzed as dry powders, unless otherwise indicated. The particles analyzed were dispersed in air and analyzed using the AERO S™ dry powder dispersion module with the MASTERSIZER™ 3000. The particle sizes were derived using instrument software from a plot of volume density as a function of size.

As used herein, when referring to sieving, pore/screen sizes are described per U.S.A. Standard Sieve (ASTM E11-17).

As used herein, the terms "circularity" relative to the particles refer to how close the particle is to a perfect sphere. To determine circularity, optical microscopy images using flow particle imaging are taken of the particles. The perimeter (P) and area (A) of the particle in the plane of the microscopy image is calculated (e.g., using a SYSMEX FPIA 3000 particle shape and particle size analyzer, available from Malvern Instruments). The circularity of the particle is CEA/P, where CEA is the circumference of a circle having the area equivalent to the area (A) of the actual particle. Herein, the circularity is based on three runs through a SYSMEX FPIA 3000 particle shape and particle size analyzer, where 6,000 to 10,000 particles are analyzed per run. The reported circularity is the median average circularity based on particle number. In the analysis, a threshold for distinguishing the greyscale levels between the background pixels and the particle pixels (e.g., to correct for non-uniform illumination conditions) was set at 90% of the background modal value.

As used herein, the term "shear" refers to stirring or a similar process that induces mechanical agitation in a fluid.

As used herein, the term "aspect ratio" refers to length divided by width, wherein the length is greater than the width.

The melting point of a polymer, unless otherwise specified, is determined by ASTM E794-06(2018) with 10° C./min ramping and cooling rates.

The softening temperature or softening point of a polymer, unless otherwise specified, is determined by ASTM D6090-17. The softening temperature can be measured by using a cup and ball apparatus available from Mettler-Toledo using a 0.50 gram sample with a heating rate of 1° C./min.

The crystallization temperature is the temperature at which a polymer crystallizes (i.e., solidification) into a structured form, naturally or in an artificially initiated process, wherein atoms or molecules are highly organized into a crystal. The crystallization temperature may be measured by Differential Scanning Calorimetry (DSC). DSC provides a rapid method for determining polymer crystallinity based on the heat required to melt the polymer. The crystallization temperature (° C.) is measured according to ASTM E794-06(2018) with 10° C./min ramping and cooling rates where the crystallization temperature is determined based on the second heating and cooling cycle.

The crystallinity (%) of a polymer, unless otherwise specified, is determined by ASTM D3418-15. For crystallinity calculations, a 100% crystalline TPU is considered to have an enthalpy of 196.8 J/g.

Mw is the weight-average molecular weight. Unless otherwise noted, Mw has units of g/mol or kDa (1,000 g/mol=1 kDa) and is measured by gel permeation chromatography.

The melt flow index (MFI) is the measure of resistance to flow of polymer melt under defined set of conditions (unit: g/10 min) and is measured by ASTM 1238-20 Standard Procedure A at 195° C. using a 2 mm orifice and a 2.16 kg load. Being a measure at low shear rate condition, MFI is inversely related to molecular weight of the polymer.

As used herein, "tensile modulus" (MPa) of a solid material is a mechanical property that measures its stiffness. It is defined as the ratio of its tensile stress (force per unit area) to its strain (relative deformation) when undergoing elastic deformation. It can be expressed in Pascals or pounds per square inch (psi). ASTM D638-14 can be used to determine tensile modulus of a polymer.

Angle of repose is a measure of the flowability of a powder. Angle of repose measurements were determined using a Hosokawa Micron Powder Characteristics Tester PT-R using ASTM D6393-14 "Standard Test Method for Bulk Solids Characterized by Carr Indices."

Aerated density ($\rho_{aer}$) is measured per ASTM D6393-14.

Bulk density ($\rho_{bulk}$) is measured per ASTM D6393-14.

Tapped density ($\rho_{tap}$) is measured per ASTM D6393-14.

Hausner ratio (H$_r$) is a measure of the flowability of a powder and is calculated by H$_r$=$\rho_{tap}$/$\rho_{bulk}$, where $\rho_{bulk}$ is the bulk density per ASTM D6393-14 and $\rho_{tap}$ is the tapped density per ASTM D6393-14.

As used herein, viscosity of carrier fluids are the kinematic viscosity at 25° C., unless otherwise specified, measured per ASTM D445-19. For commercially procured carrier fluids (e.g., polydimethylsiloxane oil (PDMS)), the kinematic viscosity data cited herein was provided by the manufacturer, whether measured according to the foregoing ASTM or another standard measurement technique.

Thermoplastic Polymer Particles and Methods of Making

The methods and compositions described herein relate to highly spherical polymer particles that comprise one or more thermoplastic polymers and lignin. For example, the present disclosure includes methods that comprise: mixing a mixture comprising: (a) a thermoplastic polymer(s), (b) lignin, (c) a carrier fluid that is immiscible with the thermoplastic polymer and lignin, and optionally (d) an emulsion stabilizer at a temperature greater than a melting point or softening temperature of each of the thermoplastic polymer(s) and lignin and at a shear rate sufficiently high to disperse the thermoplastic polymer in the carrier fluid; cooling the mixture to below the foregoing melting point or softening temperature to form spherical polymer particles; and separating the spherical polymer particles from the carrier fluid.

FIG. 1 is a flow chart of a nonlimiting example method 100 of the present disclosure. Thermoplastic polymer 102, lignin 104, carrier fluid 106, and optionally other additives 108 (e.g., an emulsion stabilizer, a compatibilizer, etc.) are combined 110 to produce a mixture 112. The components 102, 104, 106, and 108 can be added individually or in a blend of components in any order and include mixing and/or heating during the process of combining 110 the components 102, 104, 106, and 108. For example, the thermoplastic polymer 102 and the lignin 104 may be premixed before combining 110. In another example, the lignin 104 may be added while combining 110 and after addition of the thermoplastic polymer 102. In another example, the emulsion stabilizer may first be dispersed in the carrier fluid, optionally with heating said dispersion, before adding the thermoplastic polymer 102 and the lignin 104. In yet another example, the thermoplastic polymer 102 may be heated to produce a polymer melt to which the carrier fluid 106 and the lignin 104 are added together or in either order.

At least a portion of combining 110 occur in a mixing apparatus used for the processing and/or another suitable vessel. By way of nonlimiting example, the thermoplastic polymer 102 may be heated to a temperature greater than the necessary melting point or softening temperature described herein in the mixing apparatus used for the processing, and the emulsion stabilizer may be dispersed in the carrier fluid in another vessel. Then, said dispersion may be added to the melt in the mixing apparatus used for the processing.

The mixture 112 is then processed 114 by applying sufficiently high shear to the mixture 112 at a temperature greater than the melting point or softening temperature of the polymer of the thermoplastic polymer 102 to form a melt emulsion 116. The shear rate should be sufficient enough to disperse the polymer melt (e.g., comprising the thermoplastic polymer 102 and the lignin 104) in the carrier fluid 106 as droplets (i.e., the melt emulsion 116). Without being limited by theory, it is believed that, all other factors being the same, increasing shear should decrease the size of the droplets of the polymer melt in the carrier fluid 106. However, at some point there may be diminishing returns on increasing shear and decreasing droplet size or there may be disruptions to the droplet contents that decrease the quality of particles produced therefrom.

The mixing apparatuses used for the processing 114 to produce the melt emulsion 116 should be capable of maintaining the melt emulsion 116 at a temperature greater than the necessary melting point or softening temperature of the polymer(s) in the mixture 112 (e.g., the one or more polymers of the thermoplastic polymer 102) described herein and applying a shear rate sufficient to disperse the polymer melt in the carrier fluid as droplets.

Examples of mixing apparatuses used for the processing to produce the melt emulsion may include, but are not limited to, extruders (e.g., continuous extruders, batch extruders, and the like), stirred reactors, blenders, reactors with inline homogenizer systems, the like, and apparatuses derived therefrom.

The processing and forming the melt emulsion at suitable process conditions (e.g., temperature, shear rate, and the like) for a set period of time.

The temperature of the processing and forming the melt emulsion should be a temperature greater than the necessary melting point or softening temperature of the polymer(s) in the mixture 112 described herein and less than the decomposition temperature of any components 102, 104, 106, 108 in the mixture. For example, the temperature of processing 114 and forming the melt emulsion 116 may be about 1° C.

to about 50° C. (or about 1° C. to about 25° C., or about 5° C. to about 30° C., or about 20° C. to about 50° C.) greater than the melting point or softening temperature of the polymer(s) in the mixture described herein provided the temperature of processing and forming the melt emulsion is less than the decomposition temperature of any components 102, 104, 106, 108 in the mixture.

The shear rate of processing 114 and forming the melt emulsion 116 should be sufficiently high to disperse the polymer melt in the carrier fluid as droplets. Said droplets should comprise droplets having a diameter of about 1000 μm or less (or about 1 μm to about 1000 μm, or about 1 μm to about 50 μm, or about 10 μm to about 100 μm, or about 10 μm to about 250 μm, or about 50 μm to about 500 μm, or about 250 μm to about 750 μm, or about 500 μm to about 1000 μm).

The time for maintaining said temperature and shear rate for processing 114 and forming the melt emulsion 116 may be 10 seconds to 18 hours or longer (or 10 seconds to 30 minutes, or 5 minutes to 1 hour, or 15 minutes to 2 hours, or 1 hour to 6 hours, or 3 hours to 18 hours). Without being limited by theory, it is believed that a steady state of droplet sizes will be reached at which point processing can be stopped. That time may depend on, among other things, the temperature, shear rate, and the components 102, 104, 106, 108 in the mixture 112.

The melt emulsion 116 inside and/or outside the mixing vessel is then cooled 118 to solidify the droplets into polymer particles 124. Cooling 112 can be slow (e.g., allowing the melt emulsion to cool under ambient conditions) to fast (e.g., quenching). For example, the rate of cooling may range from about 10° C./hour to about 100° C./second to almost instantaneous with quenching (for example in dry ice) (or about 10° C./hour to about 60° C./hour, or about 0.5° C./minute to about 20° C./minute, or about 1° C./minute to about 5° C./minute, or about 10° C./minute to about 60° C./minute, or about 0.5° C./second to about 10° C./second, or about 10° C./second to about 100° C./second).

During cooling 118, little to no shear may be applied to the melt emulsion. In some instances, the shear applied during heating may be applied during cooling 118.

The cooled mixture resulting from cooling 118 the melt emulsion 116 may comprise solidified polymer particles and other components (e.g., the carrier fluid, excess emulsion stabilizer, and the like). The cooled mixture 120 can then be treated 122 to isolate the polymer particles 124 from other components 126 (e.g., the carrier fluid 106, excess emulsion stabilizer, and the like) and wash or otherwise purify the polymer particles 124. The solidified polymer particles 124 may be dispersed in the carrier fluid and/or settled in the carrier fluid.

The polymer particles 124 comprise the thermoplastic polymer 102, the lignin 104, and the other additives 108 (e.g., an emulsion stabilizer, a compatibilizer, etc.), when included.

The polymer particles 124 may optionally be further purified or otherwise treated 128 to yield purified polymer particles 130. Suitable treatments include, but are not limited to, washing, filtering, centrifuging, decanting, the like, and any combination thereof.

Solvents used for washing the polymer particles should generally be (a) miscible with the carrier fluid and (b) nonreactive (e.g., non-swelling and non-dissolving) with the polymer(s) of the polymer particles. Examples of solvents include, but are not limited to, hydrocarbon solvents (e.g., pentane, hexane, heptane, octane, cyclohexane, cyclopentane, decane, dodecane, tridecane, and tetradecane), aromatic hydrocarbon solvents (e.g., benzene, toluene, xylene, 2-methyl naphthalene, and cresol), ether solvents (e.g., diethyl ether, tetrahydrofuran, diisopropyl ether, and dioxane), ketone solvents (e.g., acetone and methyl ethyl ketone), alcohol solvents (e.g., methanol, ethanol, isopropanol, and n-propanol), ester solvents (e.g., ethyl acetate, methyl acetate, butyl acetate, butyl propionate, and butyl butyrate), halogenated solvents (e.g., chloroform, bromoform, 1,2-dichloromethane, 1,2-dichloroethane, carbon tetrachloride, chlorobenzene, and hexafluoroisopropanol), water, the like, and any combination thereof.

Solvent may be removed from the polymer particles by drying using an appropriate method such as air-drying, heat-drying, reduced pressure drying, freeze drying, or a hybrid thereof. The heating may be performed preferably at a temperature lower than the glass transition point of the polymer (e.g., about 50° C. to about 150° C.).

Advantageously, carrier fluids and washing solvents of the systems and methods described herein can be recycled and reused. One skilled in the art will recognize any necessary cleaning of used carrier fluid and solvent necessary in the recycling process.

The polymer particles, after separation from the other components, may optionally be further purified or otherwise treated. For example, to narrow the particle size distribution (or reduce the diameter span), the polymer particles can be passed through a sieve having a pore size of about 10 μm to about 250 μm (or about 10 μm to about 100 μm, or about 50 μm to about 200 μm, or about 150 μm to about 250 μm).

In another example, the polymer particles may be washed with water to remove surfactant while maintaining substantially all of the nanoparticles associated with the surface of the polymer particles. In yet another example purification technique, the polymer particles may be blended with additives to achieve a desired final product. For clarity, because such additives are blended with the polymer particles described herein after the particles are solidified, such additives are referred to herein as "external additives." Examples of external additives include flow aids, other polymer particles, fillers, the like, and any combination thereof.

In some instances, a surfactant used in making the polymer particles may be unwanted in downstream applications. Accordingly, yet another example purification technique may include at least substantial removal of the surfactant from the polymer particles (e.g., by washing and/or pyrolysis).

The polymer particles and/or purified polymer particles may be characterized by composition, physical structure, and the like.

The polymer particles may have a BET surface area of about 10 m²/g to about 500 m²/g (or about 10 m²/g to about 150 m²/g, or about 25 m²/g to about 100 m²/g, or about 100 m²/g to about 250 m²/g, or about 250 m²/g to about 500 m²/g).

The polymer particles may have a D10 of about 0.1 μm to about 125 μm (or about 0.1 μm to about 5 μm, about 1 μm to about 10 μm, about 5 μm to about 30 μm, or about 1 μm to about 25 μm, or about 25 μm to about 75 μm, or about 50 μm to about 85 μm, or about 75 μm to about 125 μm), a D50 of about 0.5 μm to about 200 μm (or about 0.5 μm to about 10 μm, or about 5 μm to about 50 μm, or about 30 μm to about 100 μm, or about 30 μm to about 70 μm, or about 25 μm to about 50 μm, or about 50 μm to about 100 μm, or about 75 μm to about 150 μm, or about 100 μm to about 200 μm), and a D90 of about 3 μm to about 300 μm (or about 3 μm to about 15 μm, or about 10 μm to about 50 μm, or about 25 μm to about 75 μm, or about 70 μm to about 200 μm, or about 60 μm to about 150 μm, or about 150 μm to about 300 μm), wherein D10<D50<D90. The polymer particles may also have a diameter span of about 0.2 to about 10 (or about 0.2 to about 0.5, or about 0.4 to about 0.8, or about 0.5 to about 1, or about 1 to about 3, or about 2 to about 5, or about 5 to about 10). Without limitation, diameter span values of 1.0 or greater are considered broad, and diameter spans values of 0.75 or less are considered narrow. Preferably, the polymer particles have a diameter span of about 0.2 to about 1.

In a first nonlimiting example, the polymer particles may have a D10 of about 0.1 μm to about 10 μm, a D50 of about 0.5 μm to about 25 μm, and a D90 of about 3 μm to about 50 μm, wherein D10<D50<D90. Said polymer particles may have a diameter span of about 0.2 to about 2.

In a second nonlimiting example, the polymer particles may have a D10 of about 5 μm to about 30 μm, a D50 of about 30 μm to about 70 μm, and a D90 of about 70 μm to about 120 μm, wherein D10<D50<D90. Said polymer particles may have a diameter span of about 1.0 to about 2.5.

In a third nonlimiting example, the polymer particles may have a D10 of about 25 μm to about 60 μm, a D50 of about 60 μm to about 110 μm, and a D90 of about 110 μm to about 175 μm, wherein D10<D50<D90. Said polymer particles may have a diameter span of about 0.6 to about 1.5.

In a fourth nonlimiting example, the polymer particles may have a D10 of about 75 μm to about 125 μm, a D50 of about 100 μm to about 200 μm, and a D90 of about 125 μm to about 300 μm, wherein D10<D50<D90. Said polymer particles may have a diameter span of about 0.2 to about 1.2.

In a fifth nonlimiting example, the polymer particles may have a D10 of about 1 μm to about 50 μm (or about 5 μm to about 30 μm, or about 1 μm to about 25 μm, or about 25 μm to about 50 μm), a D50 of about 25 μm to about 100 μm (or about 30 μm to about 100 μm, or about 30 μm to about 70 μm, or about 25 μm to about 50 μm, or about 50 μm to about 100 μm), and a D90 of about 60 μm to about 300 μm (or about 70 μm to about 200 μm, or about 60 μm to about 150 μm, or about 150 μm to about 300 μm), wherein D10<D50<D90. The polymer particles may also have a diameter span of about 0.4 to about 3 (or about 0.6 to about 2, or about 0.4 to about 1.5, or about 1 to about 3).

The polymer particles may have a circularity of about 0.9 or greater (or about 0.90 to about 1.0, or about 0.93 to about 0.99, or about 0.95 to about 0.99, or about 0.97 to about 0.99, or about 0.98 to 1.0).

The polymer particles may have an angle of repose of about 250 to about 45° (or about 250 to about 35°, or about 300 to about 40°, or about 350 to about 45°).

The polymer particles may have a Hausner ratio of about 1.0 to about 1.5 (or about 1.0 to about 1.2, or about 1.1 to about 1.3, or about 1.2 to about 1.35, or about 1.3 to about 1.5).

The polymer particles may have a bulk density of about 0.3 g/cm³ to about 0.8 g/cm³ (or about 0.3 g/cm³ to about 0.6 g/cm³, or about 0.4 g/cm³ to about 0.7 g/cm³, or about 0.5 g/cm³ to about 0.6 g/cm³, or about 0.5 g/cm³ to about 0.8 g/cm³).

The polymer particles may have an aerated density of about 0.5 g/cm³ to about 0.8 g/cm³ (or about 0.5 g/cm³ to about 0.7 g/cm³, or about 0.55 g/cm³ to about 0.80 g/cm³).

The polymer particles may have a tapped density of about 0.6 g/cm³ to about 0.9 g/cm³ (or about 0.60 g/cm³ to about 0.75 g/cm³, or about 0.65 g/cm³ to about 0.80 g/cm³, or about 0.70 g/cm³ to about 0.90 g/cm³).

Depending on the temperature and shear rate of processing and the composition and relative concentrations of the components (e.g., thermoplastic polymer, the carrier fluid, excess emulsion stabilizer, and the like) different shapes of the structures that compose the polymer particles may be produced. Typically, the polymer particles comprise substantially spherical particles (having a circularity of about 0.97 or greater). However, other structures including disc and elongated structures may be observed in the polymer particles. Therefore, the polymer particles may comprise one or more of (a) substantially spherical particles having a circularity of 0.97 or greater, (b) disc structures having an aspect ratio of about 2 to about 10, and (c) elongated structures having an aspect ratio of 10 or greater. Each of the (a), (b), and (c) structures have emulsion stabilizers dispersed on an outer surface of the (a), (b), and (c) structures and/or embedded in an outer portion of the (a), (b), and (c) structures. At least some of the (a), (b), and (c) structures may be agglomerated. For example, the (c) elongated structures may be laying on the surface of the (a) substantially spherical particles.

The polymer particles may have a sintering window that is within 10° C., preferably within 5° C., of the sintering window of the thermoplastic polymer or blend thereof used in the mixture.

The thermoplastic polymer and lignin combined may be present in the mixture (e.g., mixture 112 of FIG. 1) at about 5 wt % to about 60 wt % (or about 5 wt % to about 25 wt %, or about 10 wt % to about 30 wt %, or about 20 wt % to about 45 wt %, or about 25 wt % to about 50 wt %, or about 40 wt % to about 60 wt %) of the mixture.

A weight ratio of thermoplastic polymer (cumulatively) to lignin (cumulatively) present in the mixture (e.g., mixture 112 of FIG. 1) or the polymer particles (e.g., polymer particles 124/130 of FIG. 1) may be about 10:90 to about 99:1, or about 10:90 to about 50:50, or about 25:75 to about 75:25, or about 50:50 to about 99:1.

The thermoplastic polymer may be present in the polymer particles (e.g., polymer particles 124/130 of FIG. 1) at about 10 wt % to about 99 wt % (or about 10 wt % to about 80 wt %, or about 60 wt % to about 90 wt %, or about 80 wt % to about 95 wt %, or about 85 wt % to about 98 wt %, or about 90 wt % to about 99 wt %) of the polymer particles.

Examples of said thermoplastic polymers may include, but are not limited to, thermoplastic polyolefins, polyamides, polyurethanes, polyacetals, polycarbonates, polybutylene terephthalate (PBT), polyethylene terephthalate (PET), polyethylene naphthalate (PEN), polytrimethylene terephthalate (PTT), ethylene vinyl acetate copolymer (EVA), polyhexamethylene terephthalate, polystyrenes, polyvinyl chlorides, polytetrafluoroethenes, polyesters (e.g., polylactic acid), polyethers, polyether sulfones, polyetherether ketones, polyacrylates, polymethacrylates, polyimides, acrylonitrile butadiene styrene (ABS), polyphenylene sulfides, vinyl polymers, polyarylene ethers, polyarylene sulfides, polysulfones, polyether ketones, polyamide-imides, polyetherimides, polyetheresters, copolymers comprising a polyether block and a polyamide block (PEBA or polyether block amide), functionalized or nonfunctionalized ethylene/vinyl monomer polymer, functionalized or nonfunctionalized ethylene/alkyl (meth)acrylates, functionalized or nonfunctionalized (meth)acrylic acid polymers, functionalized or nonfunctionalized ethylene/vinyl monomer/alkyl (meth) acrylate terpolymers, ethylene/vinyl monomer/carbonyl terpolymers, ethylene/alkyl (meth)acrylate/carbonyl terpolymers, methylmethacrylate-butadiene-styrene (MBS)-type core-shell polymers, polystyrene-block-polybutadieneblock-poly(methyl methacrylate) (SBM) block terpolymers, chlorinated or chlorosulphonated polyethylenes, polyvinylidene fluoride (PVDF), phenolic resins, poly(ethylene/vinyl acetate), polybutadienes, polyisoprenes, styrenic block copolymers, polyacrylonitriles, silicones, the like, and any combination thereof. Copolymers comprising one or more of the foregoing may also be used in the methods and systems of the present disclosure. In some cases, copolymers of PE with polar monomers, such as poly(ethylene-co-vinyl acetate), poly(ethylene-co-methyl acrylate), poly(ethylene-co-glycidyl methacrylate), and poly(ethylene-co-vinyl alcohol) may improve compatibility in polyethylene-poly(methylmethacrylate) (PE/PMMA) blends.

The thermoplastic polymers in the compositions and methods of the present disclosure may be elastomeric or non-elastomeric. Some of the foregoing examples of thermoplastic polymers may be elastomeric or non-elastomeric depending on the exact composition of the polymer.

Thermoplastic elastomers generally fall within one of six classes: styrenic block copolymers, thermoplastic vulcanizates (also referred to as elastomeric alloys), thermoplastic polyurethanes, thermoplastic copolyesters, and thermoplastic polyamides (typically block copolymers comprising polyamide). Examples of thermoplastic elastomers can be found in Handbook of Thermoplastic Elastomers, 2nd ed., B. M. Walker and C. P. Rader, eds., Van Nostrand Reinhold, New York, 1988. Examples of thermoplastic elastomers include, but are not limited to, elastomeric polyamides, polyurethanes, copolymers comprising a polyether block and a polyamide block (PEBA or polyether block amide), methyl methacrylate-butadiene-styrene (MBS)-type core-shell polymers, polystyrene-block-polybutadiene-block-poly(methyl methacrylate) (SBM) block terpolymers, polybutadienes, polyisoprenes, styrenic block copolymers, and polyacrylonitriles), silicones, and the like. Elastomeric styrenic block copolymers may include at least one block selected from the group of: isoprene, isobutylene, butylene, ethylene/butylene, ethylene-propylene, and ethylene-ethylene/propylene. More specific elastomeric styrenic block copolymer examples include, but are not limited to, poly(styrene-ethylene/butylene), poly(styrene-ethylene/butylene-styrene), poly(styrene-ethylene/propylene), styrene-ethylene/propylene-styrene), poly(styrene-ethylene/propylene-styrene-ethylene-propylene), poly(styrene-butadiene-styrene), poly(styrene-butylene-butadiene-styrene), the like, and any combination thereof.

Examples of polyamides include, but are not limited to, polycaproamide (nylon 6, polyamide 6, or PA6), poly(hexamethylene succinamide) (nylon 4,6, polyamide 4,6, or PA4,6), polyhexamethylene adipamide (nylon 6,6, polyamide 6,6, or PA6,6), polypentamethylene adipamide (nylon 5,6, polyamide 5,6, or PA5,6), polyhexamethylene sebacamide (nylon 6,10, polyamide 6,10, or PA6,10), polyundecaamide (nylon 11, polyamide 11, or PA11), polydodecaamide (nylon 12, polyamide 12, or PA12), and polyhexamethylene terephthalamide (nylon 6T, polyamide 6T, or PA6T), nylon 10,10 (polyamide 10,10 or PA10,10), nylon 10,12 (polyamide 10,12 or PA10,12), nylon 10,14 (polyamide 10,14 or PA10,14), nylon 10,18 (polyamide 10,18 or PA10,18), nylon 6,18 (polyamide 6,18 or PA6,18), nylon 6,12 (polyamide 6,12 or PA6,12), nylon 6,14 (polyamide 6,14 or PA6,14), nylon 12,12 (polyamide 12,12 or PA12,12), the like, and any combination thereof. Copolyamides may also be used. Examples of copolyamides include, but are not limited to, PA 11/10,10, PA 6/11, PA 6,6/6, PA 11/12, PA 10,10/10,12, PA 10,10/10,14, PA 11/10, 36, PA 11/6,36, PA 10,10/10,36, PA 6T/6,6, the like, and any combination thereof. A polyamide followed by a first number comma second number is a polyamide having the first number of backbone carbons between the nitrogens for the section having no pendent $=O$ and the second number of backbone carbons being between the two nitrogens for the section having the pendent $=O$. By way of nonlimiting example, nylon 6,10 is $[NH—(CH_2)_6—NH—CO—(CH_2)_8—CO]_n$. A polyamide followed by number(s) backslash number(s) are a copolymer of the polyamides indicated by the numbers before and after the backslash.

Examples of polyurethanes include, but are not limited to, polyether polyurethanes, polyester polyurethanes, mixed polyether and polyester polyurethanes, the like, and any combination thereof. Examples of thermoplastic polyurethanes include, but are not limited to, poly[4,4'-methylenebis (phenylisocyanate)-alt-1,4-butanediol/di(propylene glycol)/polycaprolactone], ELASTOLLAN® 1190A (a polyether polyurethane elastomer, available from BASF), ELASTOLLAN® 1190A10 (a polyether polyurethane elastomer, available from BASF), the like, and any combination thereof.

Polyolefins may be polymers of one or more monomers that may include, but are not limited to, substituted or unsubstituted $C_2$ to $C_{40}$ alpha olefins, preferably $C_2$ to $C_{20}$ alpha olefins, preferably $C_2$ to $C_{12}$ alpha olefins, preferably ethylene, propylene, butene, pentene, hexene, heptene, octene, nonene, decene, undecene, dodecane, and isomers thereof. For example, the polyolefin may comprise propylene and an optional comonomers comprising one or more ethylene or $C_4$ to $C_{40}$ olefins, preferably $C_4$ to $C_{20}$ olefins, or preferably $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In another example, the polyolefin may comprise ethylene and an optional comonomers comprising one or more $C_3$ to $C_{40}$ olefins, preferably $C_4$ to $C_{20}$ olefins, or preferably $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Examples of $C_2$ to $C_{40}$ olefins may include, but are not limited to, ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

Examples of specific polyolefins may include, but are not limited to, polyethylene (as a homopolymer or a copolymer having 35 wt % or less of a $C_2$ to $C_{40}$ alpha olefin comonomer), polypropylene (as a homopolymer or a copolymer having 35 wt % or less of a $C_4$ to $C_{40}$ alpha olefin comonomer), ethylene-propylene copolymers, ethylene-propylene-diene copolymers, polybutene, polyisobutylene, polymethylpentene, poly (4-methyl-1-pentene), the like, and any combination thereof.

The thermoplastic polymer may have a melting point or softening temperature of about 50° C. to about 450° C. (or about 50° C. to about 125° C., or about 100° C. to about 175°

C., or about 150° C. to about 280° C., or about 200° C. to about 350° C., or about 300° C. to about 450° C.).

The thermoplastic polymer may have a glass transition temperature (ASTM E1356-08(2014) with 10° C./min ramping and cooling rates) of about –50° C. to about 400° C. (or about –50° C. to about 0° C., or about –25° C. to about 50° C., or about 0° C. to about 150° C., or about 100° C. to about 250° C., or about 150° C. to about 300° C., or about 200° C. to about 400° C.).

The thermoplastic polymer may optionally comprise an additive. Typically, the additive would be present before addition of said polymers to the mixture. Therefore, in the polymer melt droplets and resultant polymer particles, the additive is dispersed throughout the thermoplastic polymer. Accordingly, for clarity, this additive is referred to herein as an "internal additive." The internal additive may be blended with the said polymer just prior to making the mixture or well in advance.

When describing component amounts in the compositions described herein (e.g., the mixture and the polymer particles), a weight percent based on the polymer not inclusive of the internal additive. For example, a composition comprising 1 wt % of emulsion stabilizer by weight of 100 g of a polymer comprising 10 wt % internal additive and 90 wt % polymer is a composition comprising 0.9 g of emulsion stabilizer, 90 g of polymer, and 10 g of internal additive.

The internal additive may be present in the thermoplastic polymer at about 0.1 wt % to about 60 wt % (or about 0.1 wt % to about 5 wt %, or about 1 wt % to about 10 wt %, or about 5 wt % to about 20 wt %, or about 10 wt % to about 30 wt %, or about 25 wt % to about 50 wt %, or about 40 wt % to about 60 wt %) of the thermoplastic polymer. For example, the thermoplastic polymer may comprise about 70 wt % to about 85 wt % of a thermoplastic polymer and about 15 wt % to about 30 wt % of an internal additive like glass fiber or carbon fiber.

Examples of internal additives include, but are not limited to, fillers, strengtheners, pigments, pH regulators, the like, and combinations thereof. Examples of fillers include, but are not limited to, glass fibers, glass particles, mineral fibers, carbon fiber, oxide particles (e.g., titanium dioxide and zirconium dioxide), metal particles (e.g., aluminum powder), the like, and any combination thereof. Examples of pigments include, but are not limited to, organic pigments, inorganic pigments, carbon black, the like, and any combination thereof. For example, fillers used herein may include exfoliated graphite (EG), exfoliated graphite nanoplatelets (xGnP), carbon black, carbon nanofibers (CNF), carbon nanotubes (CNT), graphenes, graphene oxides, graphite oxides, graphene oxide nanosheets, and/or fullerenes.

The lignin may be unmodified (e.g., as-extracted from a biosource) or modified. The lignin in the mixture (e.g., mixture 112 of FIG. 1) or the polymer particles (e.g., polymer particles 124/130 of FIG. 1) may be one or more of the foregoing lignins.

The source of the lignin may be a hardwood, a softwood, a grass, an agricultural residue (e.g., corn husks), or the like. Examples of sources of lignin may include, but are not limited to, rice husk, corn stalks, wheat straw, sugar cane, bagasse, switchgrass, alfalfa, kenaf, flax fiber, cotton, hemp, jute, wood pulp, eucalyptus, *Eucalyptus camaldulensis*, poplar, pine, pine straw, cedar, white spruce, red river gum, oak, bamboo, the like, and any combination thereof. The lignin in the mixture (e.g., mixture 112 of FIG. 1) or the polymer particles (e.g., polymer particles 124/130 of FIG. 1) may be one or more of the foregoing sources.

Examples of lignin extraction methods include, but are not limited to, organosolv (e.g., organocell, alcell), kraft, sulfite pulping, solvent pulping, and soda pulping. The resulting lignin may be unmodified or modified by the pulping process. Such lignins may be include in the methods and compositions described herein.

Modified lignins may include one or more of the following moieties: sulfate, sodium sulfate, sulfonate, sodium sulfonate, sulfonic acid, alcohol, phenol, amide, hydroxymethyl group, quaternary ammonium group, epoxy, hydroxyl, carboxylic acid, thiol and the like. The lignin may be sulfur containing or sulfur-free. When a modified lignin is included, the lignin in the mixture (e.g., mixture 112 of FIG. 1) or the polymer particles (e.g., polymer particles 124/130 of FIG. 1) may include one or more different modified lignins and optionally in combination with one or more unmodified lignins.

Modified lignins may also include lignin molecules grafted with a thermoplastic polymer. Examples of such polymers include those described herein relative to blending with lignin. Some preferred polymers include polyacrylamide, polyacrylic acid, polystyrene, and polymethyl methacrylate. The graft may be achieved by polymerization of said thermoplastic polymer in the presence of lignin so as to cause polymerization to occur off of suitable moieties of a lignin or a modified lignin. Alternatively, already-made polymer may be attached to suitable moieties of a lignin or a modified lignin.

The lignin may be present in the polymer particles (e.g., polymer particles 124/130 of FIG. 1) at about 1 wt % to about 90 wt % (or about 1 wt % to about 25 wt %, or about 10 wt % to about 50 wt %, or about 25 wt % to about 80 wt %, or about 60 wt % to about 90 wt %) of the polymer particles.

The carrier fluid should be chosen such that at the various processing temperatures (e.g., from room temperature to process temperature) the thermoplastic polymer and the carrier fluid are immiscible. An additional factor that may be considered is the differences in (e.g., a difference or a ratio of) viscosity at process temperature between the thermoplastic polymer and the carrier fluid. The differences in viscosity may affect droplet breakup and particle size distribution. Without being limited by theory, it is believed that when the viscosities of the thermoplastic polymer and the carrier fluid are too similar, the circularity of the product as a whole may be reduced where the particles are more ovular and more elongated structures are observed.

Suitable carrier fluids may have a viscosity at 25° C. of about 1,000 cSt to about 150,000 cSt (or about 1,000 cSt to about 60,000 cSt, or about 40,000 cSt to about 100,000 cSt, or about 75,000 cSt to about 150,000 cSt). For example, suitable carrier fluids may have a viscosity at 25° C. of about 10,000 cSt to about 60,000 cSt.

Examples of carrier fluids may include, but are not limited to, silicone oil, fluorinated silicone oils, perfluorinated silicone oils, polyethylene glycols, alkyl-terminal polyethylene glycols (e.g., C1-C4 terminal alkyl groups like tetraethylene glycol dimethyl ether (TDG)), paraffins, liquid petroleum jelly, vison oils, turtle oils, soya bean oils, perhydrosqualene, sweet almond oils, calophyllum oils, palm oils, parleam oils, grapeseed oils, sesame oils, maize oils, rapeseed oils, sunflower oils, cottonseed oils, apricot oils, castor oils, avocado oils, jojoba oils, olive oils, cereal germ oils, esters of lanolic acid, esters of oleic acid, esters of lauric acid, esters of stearic acid, fatty esters, higher fatty acids, fatty alcohols, polysiloxanes modified with fatty acids, polysiloxanes modified with fatty alcohols, polysiloxanes modified with polyoxy alkylenes, the like, and any combination thereof. Examples of silicone oils include, but are not limited to, polydimethylsiloxane (PDMS), methylphenylpolysiloxane, an alkyl modified polydimethylsiloxane, an alkyl modified methylphenylpolysiloxane, an amino modified polydimethylsiloxane, an amino modified methylphenylpolysiloxane, a fluorine modified polydimethylsiloxane, a fluorine modified methylphenylpolysiloxane, a polyether modified polydimethylsiloxane, a polyether modified methylphenylpolysiloxane, the like, and any combination thereof. When the carrier fluid comprises two or more of the foregoing, the carrier fluid may have one or more phases. For example, polysiloxanes modified with fatty acids and polysiloxanes modified with fatty alcohols (preferably with similar chain lengths for the fatty acids and fatty alcohols) may form a single-phase carrier fluid. In another example, a carrier fluid comprising a silicone oil and an alkyl-terminal polyethylene glycol may form a two-phase carrier fluid. In at least one embodiment, the carrier fluid is polydimethylsiloxane (PDMS).

The carrier fluid may be present in the mixture at about 40 wt % to about 95 wt % (or about 75 wt % to about 95 wt %, or about 70 wt % to about 90 wt %, or about 55 wt % to about 80 wt %, or about 50 wt % to about 75 wt %, or about 40 wt % to about 60 wt %) of the mixture.

In some instances, the carrier fluid may have a density of about 0.6 g/cm³ to about 1.5 g/cm³, and the thermoplastic polymer may have a density of about 0.7 g/cm³ to about 1.7 g/cm³, wherein the thermoplastic polymer may have a density similar, lower, or higher than the density of the carrier fluid.

Other additives like emulsion stabilizers, thermoplastic polymers, compatibilizers, the like, and any combination thereof may be included in the mixture and resultant polymer particles.

The emulsion stabilizers used in the methods and compositions of the present disclosure may comprise nanoparticles (e.g. oxide nanoparticles, carbon black, polymer nanoparticles, and combinations thereof), surfactants, the like, and any combination thereof.

Oxide nanoparticles may be metal oxide nanoparticles, non-metal oxide nanoparticles, or mixtures thereof. Examples of oxide nanoparticles include, but are not limited to, silica, titania, zirconia, alumina, iron oxide, copper oxide, tin oxide, boron oxide, cerium oxide, thallium oxide, tungsten oxide, the like, and any combination thereof. Mixed metal oxides and/or non-metal oxides, like aluminosilicates, borosilicates, and aluminoborosilicates, are also inclusive in the term metal oxide. The oxide nanoparticles may by hydrophilic or hydrophobic, which may be native to the particle or a result of surface treatment of the particle. For example, a silica nanoparticle having a hydrophobic surface treatment, like dimethyl silyl, trimethyl silyl, or the like, may be used in methods and compositions of the present disclosure. Additionally, silica with functional surface treatments like methacrylate functionalities may be used in methods and compositions of the present disclosure. Unfunctionalized oxide nanoparticles may also be suitable for use as well.

Commercially available examples of silica nanoparticles include, but are not limited to, AEROSIL® particles available from Evonik (e.g., AEROSIL® R812S (about 7 nm average diameter silica nanoparticles having a hydrophobically modified surface and a BET surface area of 260±30 m²/g), AEROSIL® RX50 (about 40 nm average diameter m²/g) silica nanoparticles having a hydrophobically modified surface and a BET surface area of 35±10 m²/g), AEROSIL®

380 (silica nanoparticles having a hydrophilically modified surface and a BET surface area of 380±30 m²/g), the like, and any combination thereof.

Carbon black is another type of nanoparticle that may be present as an emulsion stabilizer in the compositions and methods disclosed herein. Various grades of carbon black will be familiar to one having ordinary skill in the art, any of which may be used herein. Other nanoparticles capable of absorbing infrared radiation may be used similarly.

Polymer nanoparticles are another type of nanoparticle that may be present as an emulsion stabilizer in the disclosure herein. Suitable polymer nanoparticles may include one or more polymers that are thermosetting and/or crosslinked, such that they do not melt when processed by melt emulsification according to the disclosure herein. High molecular weight thermoplastic polymers having high melting or decomposition points may similarly comprise suitable polymer nanoparticle emulsion stabilizers.

Surfactants may be anionic, cationic, nonionic, or zwitterionic. Examples of surfactants include, but are not limited to, sodium dodecyl sulfate, sorbitan oleates, poly[dimethylsiloxane-co-[3-(2-(2-hydroxyethoxy)ethoxy)propylmethylsiloxane]], docusate sodium (sodium 1,4-bis(2-ethylhexoxy)-1,4-dioxobutane-2-sulfonate), the like, and any combination thereof. Commercially available examples of surfactants include, but are not limited to, CALFAX® DB-45 (sodium dodecyl diphenyl oxide disulfonate, available from Pilot Chemicals), SPAN® 80 (sorbitan maleate non-ionic surfactant), MERPOL® surfactants (available from Stepan Company), TERGITOL™ TMN-6 (a water-soluble, nonionic surfactant, available from DOW), TRITON™ X-100 (octyl phenol ethoxylate, available from SigmaAldrich), IGEPAL® CA-520 (polyoxyethylene (5) isooctylphenyl ether, available from SigmaAldrich), BRIJ® S10 (polyethylene glycol octadecyl ether, available from SigmaAldrich), the like, and any combination thereof.

Surfactants may be included in the mixture (e.g., mixture 112 of FIG. 1) or the polymer particles (e.g., polymer particles 124/130 of FIG. 1) in an amount of about 0.01 wt % to about 10 wt % (or about 0.01 wt % to about 1 wt %, or about 0.5 wt % to about 2 wt %, or about 1 wt % to about 3 wt %, or about 2 wt % to about 5 wt %, or about 5 wt % to about 10 wt %) based on a total weight of thermoplastic polymer in the mixture or thermoplastic polymer in the polymer particles. Alternatively, the mixture may comprise no (or be absent of) surfactant.

A weight ratio of nanoparticles to surfactant in the emulsion stabilizer in the mixture (e.g., mixture 112 of FIG. 1) or the polymer particles (e.g., polymer particles 124/130 of FIG. 1) may be about 1:10 to about 10:1 (or about 1:10 to about 1:1, or about 1:5 to about 5:1, or about 1:1 to about 10:1).

The emulsion stabilizer may be included in the mixture (e.g., mixture 112 of FIG. 1) or the polymer particles (e.g., polymer particles 124/130 of FIG. 1) in an amount of about 0.01 wt % to about 10 wt % (or about 0.01 wt % to about 1 wt %, or about 0.1 wt % to about 3 wt %, or about 1 wt % to about 5 wt %, or about 5 wt % to about 10 wt %) based on a total weight of thermoplastic polymer in the mixture or thermoplastic polymer in the polymer particles.

The emulsion stabilizers may be at the interface between the polymer melt and the carrier fluid in the melt emulsion. As a result, when the mixture is cooled, the emulsion stabilizers remain at, or in the vicinity of, said interface. Therefore, the structure of the polymer particles is, in general when emulsion stabilizers are used, includes emulsion stabilizers (a) dispersed on an outer surface of the polymer particles and/or (b) embedded in an outer portion (e.g., outer 1 vol %) of the polymer particles. That is, emulsion stabilizers, when included, may be deposited as coating, perhaps a uniform coating, on the polymer particles. In some instances, which may be dependent upon nonlimiting factors such as the temperature (including cooling rate), the type of thermoplastic polymer, and the types and sizes of emulsion stabilizers, the nanoparticles of emulsion stabilizers may become at least partially embedded within the outer surface of polymer particles. Even without embedment taking place, at least a portion of the nanoparticles within emulsion stabilizers may remain robustly associated with polymer particles to facilitate their further use. In contrast, dry blending already-formed polymer particulates (e.g., formed by cryogenic grinding or precipitation processes) with a flow aid like silica nanoparticles does not result in a robust, uniform coating of the flow aid upon the polymer particulates.

At least a portion of the surfactant, if used, may be associated with the outer surface as well. The coating of the emulsion stabilizer (e.g., comprising surfactants and/or nanoparticles) may be disposed substantially uniformly upon the outer surface. As used herein with respect to a coating, the term "substantially uniform" refers to even coating thickness in surface locations covered by the coating composition (e.g., nanoparticles and/or surfactant), particularly the entirety of the outer surface. The emulsion stabilizers may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the polymer particles. When purified to at least substantially remove surfactant or another emulsion stabilizer, the emulsion stabilizers may be present on an outer surface of the polymer particles at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the polymer particles. The coverage of the emulsion stabilizers on an outer surface of the polymer particles may be determined using image analysis of the scanning electron microscope images (SEM micrographs). The emulsion stabilizers may form a coating that covers at least 5% (or about 5% to about 100%, or about 5% to about 25%, or about 20% to about 50%, or about 40% to about 70%, or about 50% to about 80%, or about 60% to about 90%, or about 70% to about 100%) of the surface area of the polymer particles. When purified to at least substantially remove surfactant or another emulsion stabilizer, the emulsion stabilizers may be present on an outer surface of the polymer particles at less than 25% (or 0% to about 25%, or about 0.1% to about 5%, or about 0.1% to about 1%, or about 1% to about 5%, or about 1% to about 10%, or about 5% to about 15%, or about 10% to about 25%) of the surface area of the polymer particles. The coverage of the emulsion stabilizers on an outer surface of the polymer particles may be determined using image analysis of the SEM micrographs.

Further, where voids form inside the polymer melt droplets, emulsion stabilizers should generally be at (and/or embedded in) the interface between the interior of the void and the polymer. The voids generally do not contain polymer. Rather, the voids may contain, for example, carrier fluid, air, or be void. The polymer particles described herein may comprise carrier fluid at about 5 wt % or less (or about 0.001 wt % to about 5 wt %, or about 0.001 wt % to about 0.1 wt %, or about 0.01 wt % to about 0.5 wt %, or about 0.1 wt % to about 2 wt %, or about 1 wt % to about 5 wt %) of the polymer particles.

Compatibilizers may optionally be used to improve the blending efficiency and efficacy when two or more thermoplastic polymers are used. Examples of polymer compatibilizers include, but not limited to, PROPOLDER™ MPP2020 20 (polypropylene, available from Polygroup Inc.), PROPOLDER™ MPP2040 40 (polypropylene, available from Polygroup Inc.), NOVACOM™ HFS2100 (maleic anhydride functionalized high density polyethylene polymer, available from Polygroup Inc.), KEN-REACT™ CAPS™ L™ 12/L (organometallic coupling agent, available from Kenrich Petrochemicals), KEN-REACT™ CAPOW™ L™ 12/H (organometallic coupling agent, available from Kenrich Petrochemicals), KEN-REACT™ LICA™ 12 (organometallic coupling agent, available from Kenrich Petrochemicals), KEN-REACT™ CAPS™ KPR™ 12/LV (organometallic coupling agent, available from Kenrich Petrochemicals), KEN-REACT™ CAPOW™ KPR™ 12/H (organometallic coupling agent, available from Kenrich Petrochemicals), KEN-REACT™ titanates & zirconates (organometallic coupling agent, available from Kenrich Petrochemicals), VISTAMAXX™ (ethylene-propylene copolymers, available from ExxonMobil), SANTO-PRENE™ (thermoplastic vulcanizate of ethylene-propylene-diene rubber and polypropylene, available from Exxon-Mobil), VISTALON™ (ethylene-propylene-diene rubber, available from ExxonMobil), EXACT™ (plastomers, available from ExxonMobil) EXXELOR™ (polymer resin, available from ExxonMobil), FUSABOND™ M603 (random ethylene copolymer, available from Dow), FUSABOND™ E226 (anhydride modified polyethylene, available from Dow), BYNEL™ 41E710 (coextrudable adhesive resin, available from Dow), SURLYN™ 1650 (ionomer resin, available from Dow), FUSABOND™ P353 (a chemically modified polypropylene copolymer, available from Dow), ELVALOY™ PTW (ethylene terpolymer, available from Dow), ELVALOY™ 3427AC (a copolymer of ethylene and butyl acrylate, available from Dow), LOTADER™ AX8840 (ethylene acrylate-based terpolymer, available from Arkema), LOTADER™ 3210 (ethylene acrylate-based terpolymer, available from Arkema), LOTADER™ 3410 (ethylene acrylate-based terpolymer, available from Arkema), LOTADER™ 3430 (ethylene acrylate-based terpolymer, available from Arkema), LOTADER™ 4700 (ethylene acrylate-based terpolymer, available from Arkema), LOTADER™ AX8900 (ethylene acrylate-based terpolymer, available from Arkema), LOTADER™ 4720 (ethylene acrylate-based terpolymer, available from Arkema), BAXXODUR™ EC 301 (amine for epoxy, available from BASF), BAXXODUR™ EC 311 (amine for epoxy, available from BASF), BAXXODUR™ EC 303 (amine for epoxy, available from BASF), BAXXODUR™ EC 280 (amine for epoxy, available from BASF), BAXXODUR™ EC 201 (amine for epoxy, available from BASF), BAXXODUR™ EC 130 (amine for epoxy, available from BASF), BAXXODUR™ EC 110 (amine for epoxy, available from BASF), styrenics, polypropylene, polyamides, polycarbonate, EASTMAN™ G-3003 (a maleic anhydride grafted polypropylene, available from Eastman), RETAIN™ (polymer modifier available from Dow), AMPLIFY TY™ (maleic anhydride grafted polymer, available from Dow), INTUNE™ (olefin block copolymer, available from Dow), and the like and any combination thereof.

Applications of Polymer Particles

The present disclosure also relates to methods of selective laser sintering where the method may comprise: depositing (a) highly spherical polymer particles comprising (a1) one or more thermoplastic polymers, (a2) one or more lignins, and optionally (a3) additives described herein (e.g., emulsion stabilizer, compatibilizers, and the like) and optionally (b) thermoplastic polymer particles different than the particles (a) onto a surface; and once deposited, exposing at least a portion of the particles (a) and (b) (if included) to a laser to fuse the particles (a) and (b) (if included) and form a consolidated body.

The polymer particles described herein may be used to produce a variety of articles. By way of nonlimiting example, 3-D printing processes of the present disclosure may comprise: depositing particles (e.g., the foregoing particles (a) and (b) (if included)) described herein upon a surface (e.g., in layers and/or in a specified shape), and once deposited, heating at least a portion of the particles to promote consolidation thereof and form a consolidated body (or object). The consolidated body may have a void percentage of about 5% or less (e.g., 0% to about 5%, or about 0.5% to about 2%, or about 1% to about 3%, or about 2% to about 5%) after being consolidated. For example, heating and consolidation of the polymer particles (e.g., polymer particles 124/130 and other thermoplastic polymer particles) may take place in a 3-D printing apparatus employing a laser, such that heating and consolidation take place by selective laser sintering.

Examples of articles that may be produced by such methods where the polymer particles may be used to form all or a portion of said articles include, but are not limited to, particles, films, packaging, toys, household goods, automotive parts, aerospace/aircraft-related parts, containers (e.g., for food, beverages, cosmetics, personal care compositions, medicine, and the like), shoe soles, furniture parts, decorative home goods, plastic gears, screws, nuts, bolts, cable ties, jewelry, art, sculpture, medical items, prosthetics, orthopedic implants, production of artifacts that aid learning in education, 3D anatomy models to aid in surgeries, robotics, biomedical devices (orthotics), home appliances, dentistry, electronics, sporting goods, and the like. Further, particles may be useful in applications that include, but are not limited to, paints, powder coatings, ink jet materials, electrophotographic toners, 3D printing, and the like.

Further, the polymer particles described herein comprising a thermoplastic polymer and lignin may be used in applications beyond additive manufacturing. For example, the polymer particles may be used as delivery systems for various chemicals (e.g., pesticides, nutrients, and the like) in agriculture technologies. Similarly, cosmetics and biomedical applications may utilized these potential delivery systems.

In another example, the polymer particles described herein comprising a thermoplastic polymer and lignin may be used in barrier coatings. The barrier coatings may be useful for paper and packaging materials.

In additional examples, the polymer particles described herein comprising a thermoplastic polymer and lignin may be used in adhesives, low-grade fuel, light-weight materials, batteries (e.g., in the cathode and/or anode material), and wound dressings.

Additionally, the polymer particles may include additives like pigments, antimicrobial agents, and the like for use in coatings and paints.

Lignin may impart one or more of the following properties to the objects produced from and/or end-use applications in which the polymer particles described herein comprising a thermoplastic polymer and lignin are implemented: antibacterial, antioxidizing, UV-protecting, anti-weathering, anti-aging, and biodegradable properties.

EXAMPLE EMBODIMENTS

A first nonlimiting example embodiment is a method comprising: mixing a mixture comprising: a thermoplastic polymer, a lignin, a carrier fluid, and optionally an emulsion stabilizer at a temperature at or greater than a melting point or softening temperature of the thermoplastic polymer to emulsify a thermoplastic polymer melt in the carrier fluid; cooling the mixture to below the melting point or softening temperature to form polymer particles; and separating the polymer particles from the carrier fluid, wherein the polymer particles comprise the thermoplastic polymer, the lignin, the emulsion stabilizer, if included. The first nonlimiting example embodiment may include one or more of: Element 1: wherein the lignin comprises a modified lignin; Element 2: wherein the lignin comprises a modified lignin and an unmodified lignin; Element 3: wherein the lignin is present in the polymer particle in an amount of at about 1 wt % to about 90 wt % of the thermoplastic polymer; Element 4: wherein the thermoplastic polymer comprises one or more of: a thermoplastic polyolefin, a polyamide, a polyurethane, a polyacetal, a polycarbonate, polybutylene terephthalate (PBT), polyethylene terephthalate (PET), polyethylene naphthalate (PEN), polytrimethylene terephthalate (PTT), ethylene vinyl acetate copolymer (EVA), polyhexamethylene terephthalate, a polystyrene, a polyvinyl chloride, a polytetrafluoroethene, a polyester (e.g., polylactic acid), a polyether, a polyether sulfone, a polyetherether ketone, a polyacrylate, a polymethacrylate, a polyimide, acrylonitrile butadiene styrene (ABS), a polyphenylene sulfide, a vinyl polymer, a polyarylene ether, a polyarylene sulfide, a polysulfone, a polyether ketone, a polyamide-imide, a polyetherimide, a polyetherester, a copolymer comprising a polyether block and a polyamide block (PEBA or polyether block amide), a functionalized or nonfunctionalized ethylene/vinyl monomer polymer, a functionalized or nonfunctionalized ethylene/alkyl (meth)acrylate, a functionalized or nonfunctionalized (meth)acrylic acid polymer, a functionalized or nonfunctionalized ethylene/vinyl monomer/alkyl (meth) acrylate terpolymer, an ethylene/vinyl monomer/carbonyl terpolymer, an ethylene/alkyl (meth)acrylate/carbonyl terpolymer, a methylmethacrylate-butadiene-styrene (MBS)-type core-shell polymer, a polystyrene-block-polybutadiene-block-poly(methyl methacrylate) (SBM) block terpolymer, a chlorinated or chlorosulphonated polyethylene, a polyvinylidene fluoride (PVDF), a phenolic resin, poly(ethylene/vinyl acetate), a polybutadiene, a polyisoprene, a styrenic block copolymer, a polyacrylonitrile, and a silicone; Element 5: wherein the thermoplastic polymer comprises one or more substituted or unsubstituted $C_2$ to C40 alpha olefins; Element 6: wherein the thermoplastic polymer comprises a monomer selected from the group consisting of: polyethylene, polypropylene, ethylene-propylene copolymers, ethylene-propylene-diene copolymers, polybutene, polyisobutylene, polymethylpentene, poly (4-methyl-1-pentene), and any combination thereof; Element 7: wherein the polymer particles have a circularity of about 0.90 to about 1.0; Element 8: wherein the polymer particles have an angle of repose of about 250 to about 45°; Element 9: wherein the polymer particles have a Hausner ratio of about 1.0 to about 1.5; Element 10: wherein the polymer particles have a D10 of about 0.1 µm to about 125 µm, a D50 of about 0.5 µm to about 200 µm, and a D90 of about 3 µm to about 300 µm, wherein D10<D50<D90; Element 11: wherein the polymer particles have a diameter span of about 0.2 to about 10; Element 12: wherein the polymer particles have an aerated density of about 0.5 g/cm³ to about 0.8 g/cm³; Element 13: wherein the polymer particles have a bulk density of about 0.3 g/cm³ to about 0.8 g/cm³; Element 14: wherein the polymer particles have a tapped density of about 0.6 g/cm³ to about 0.9 g/cm³; Element 15: wherein the polymer particles have a BET surface area of about 10 m²/g to about 500 m²/g; Element 16: wherein the polymer particles further comprise an emulsion stabilizer covering at least a portion of a surface of the polymer particles; and Element 17: wherein the polymer particles further comprise a nanoparticle emulsion stabilizer embedded in a surface of the polymer particles. Examples of combinations include, but are not limited to, Element 1 or Element 2 in combination with one or more of Elements 3-17; Element 3 in combination with one or more of Elements 4-17; one or more of Elements 4-6 in combination with one or more of Elements 7-17; two or more of Elements 7-15 in combination; one or more of Elements 7-15 in combination with one or both of Elements 16 and 17; and Elements 16 and 17 in combination.

A second nonlimiting example embodiment is a composition comprising: polymer particles comprising a thermoplastic polymer, a lignin, optionally an emulsion stabilizer, and optionally a compatibilizer. The second nonlimiting example embodiment may include one or more of: Element 1; Element 2; Element 3; Element 4; Element 5; Element 6; Element 7; Element 8; Element 9; Element 10; Element 11; Element 12; Element 13; Element 14; Element 15; Element 16; and Element 17. Examples of combinations include, but are not limited to, Element 1 or Element 2 in combination with one or more of Elements 3-17; Element 3 in combination with one or more of Elements 4-17; one or more of Elements 4-6 in combination with one or more of Elements 7-17; two or more of Elements 7-15 in combination; one or more of Elements 7-15 in combination with one or both of Elements 16 and 17; and Elements 16 and 17 in combination.

A third nonlimiting example embodiment is a method comprising: depositing first polymer particles and optionally second polymer particles different than the first particles onto a surface, wherein the first polymer particles have a composition according to the second nonlimiting example embodiment; and once deposited, exposing at least a portion of the first and second particles, when included, to a laser to fuse the first and second particles, when included, and form a consolidated body. The third nonlimiting example embodiment may include one or more of: Element 1; Element 2; Element 3; Element 4; Element 5; Element 6; Element 7; Element 8; Element 9; Element 10; Element 11; Element 12; Element 13; Element 14; Element 15; Element 16; Element 17; and Element 18: wherein the consolidated body has a void percentage of about 5% or less. Examples of combinations include, but are not limited to, Element 1 or Element 2 in combination with one or more of Elements 3-18; Element 3 in combination with one or more of Elements 4-18; one or more of Elements 4-6 in combination with one or more of Elements 7-18; two or more of Elements 7-15 in combination; one or more of Elements 7-15 in combination with one or more of Elements 16-18; Elements 16 and 17 in combination; and Element 18 in combination with one or both of Elements 16 and 17.

A fourth nonlimiting example embodiment is a selective laser sintered article comprising polymer particles sintered together, wherein the polymer particles comprise first polymer particles having a composition according to the second nonlimiting example embodiment. The fourth nonlimiting example embodiment may include one or more of: Element 1; Element 2; Element 3; Element 4; Element 5; Element 6; Element 7; Element 8; Element 9; Element 10; Element 11; Element 12; Element 13; Element 14; Element 15; Element 16; Element 17; and Element 19: wherein the selective laser sintered article has a void percentage of about 5% or less. Examples of combinations include, but are not limited to, Element 1 or Element 2 in combination with one or more of Elements 3-19; Element 3 in combination with one or more of Elements 4-19; one or more of Elements 4-6 in combination with one or more of Elements 7-19; two or more of Elements 7-15 in combination; one or more of Elements 7-15 in combination with one or more of Elements 16-19; Elements 16 and 17 in combination; and Element 19 in combination with one or both of Elements 16 and 17.

Clauses

Clause 1. A method comprising: mixing a mixture comprising: a thermoplastic polymer, a lignin, a carrier fluid, and optionally an emulsion stabilizer at a temperature at or greater than a melting point or softening temperature of the thermoplastic polymer to emulsify a thermoplastic polymer melt in the carrier fluid; cooling the mixture to below the melting point or softening temperature to form polymer particles; and separating the polymer particles from the carrier fluid, wherein the polymer particles comprise the thermoplastic polymer, the lignin, the emulsion stabilizer, if included.

Clause 2. The method of Clause 1, wherein the lignin comprises a modified lignin.

Clause 3. The method of Clause 1, wherein the lignin comprises a modified lignin and an unmodified lignin.

Clause 4. The method of Clause 1, wherein the lignin is present in the polymer particle in an amount of at about 1 wt % to about 90 wt % of the thermoplastic polymer.

Clause 5. The method of Clause 1, wherein the thermoplastic polymer comprises one or more of: a thermoplastic polyolefin, a polyamide, a polyurethane, a polyacetal, a polycarbonate, polybutylene terephthalate (PBT), polyethylene terephthalate (PET), polyethylene naphthalate (PEN), polytrimethylene terephthalate (PTT), ethylene vinyl acetate copolymer (EVA), polyhexamethylene terephthalate, a polystyrene, a polyvinyl chloride, a polytetrafluoroethene, a polyester (e.g., polylactic acid), a polyether, a polyether sulfone, a polyetherether ketone, a polyacrylate, a polymethacrylate, a polyimide, acrylonitrile butadiene styrene (ABS), a polyphenylene sulfide, a vinyl polymer, a polyarylene ether, a polyarylene sulfide, a polysulfone, a polyether ketone, a polyamide-imide, a polyetherimide, a polyetherester, a copolymer comprising a polyether block and a polyamide block (PEBA or polyether block amide), a functionalized or nonfunctionalized ethylene/vinyl monomer polymer, a functionalized or nonfunctionalized ethylene/alkyl (meth)acrylate, a functionalized or nonfunctionalized (meth)acrylic acid polymer, a functionalized or nonfunctionalized ethylene/vinyl monomer/alkyl (meth)acrylate terpolymer, an ethylene/vinyl monomer/carbonyl terpolymer, an ethylene/alkyl (meth)acrylate/carbonyl terpolymer, a methylmethacrylate-butadiene-styrene (MBS)-type coreshell polymer, a polystyrene-block-polybutadiene-block-poly(methyl methacrylate) (SBM) block terpolymer, a chlorinated or chlorosulphonated polyethylene, polyvinylidene fluoride (PVDF), a phenolic resin, poly(ethylene/vinyl acetate), a polybutadiene, a polyisoprene, a styrenic block copolymer, a polyacrylonitrile, and a silicone.

Clause 6. The method of Clause 1, wherein the thermoplastic polymer comprises one or more substituted or unsubstituted $C_2$ to $C_{40}$ alpha olefins.

Clause 7. The method of Clause 1, wherein the thermoplastic polymer comprises a monomer selected from the group consisting of: polyethylene, polypropylene, ethylene-propylene copolymers, ethylene-propylene-diene copolymers, polybutene, polyisobutylene, polymethylpentene, poly (4-methyl-1-pentene), and any combination thereof.

Clause 8. The method of Clause 1, wherein the polymer particles have a circularity of about 0.90 to about 1.0.

Clause 9. The method of Clause 1, wherein the polymer particles have an angle of repose of about 250 to about 45°.

Clause 10. The method of Clause 1, wherein the polymer particles have a Hausner ratio of about 1.0 to about 1.5.

Clause 11. The method of Clause 1, wherein the polymer particles have a D10 of about 0.1 μm to about 125 μm, a D50 of about 0.5 μm to about 200 μm, and a D90 of about 3 μm to about 300 μm, wherein D10<D50<D90.

Clause 12. The method of Clause 1, wherein the polymer particles have a diameter span of about 0.2 to about 10.

Clause 13. The method of Clause 1, wherein the polymer particles have an aerated density of about 0.5 g/cm³ to about 0.8 g/cm³.

Clause 14. The method of Clause 1, wherein the polymer particles have a bulk density of about 0.3 g/cm³ to about 0.8 g/cm³.

Clause 15. The method of Clause 1, wherein the polymer particles have a tapped density of about 0.6 g/cm³ to about 0.9 g/cm³.

Clause 16. The method of Clause 1, wherein the polymer particles have a BET surface area of about 10 m²/g to about 500 m²/g.

Clause 17. The method of Clause 1, wherein the polymer particles further comprise an emulsion stabilizer covering at least a portion of a surface of the polymer particles.

Clause 18. The method of Clause 1, wherein the polymer particles further comprise a nanoparticle emulsion stabilizer embedded in a surface of the polymer particles.

Clause 19. A composition comprising: polymer particles comprising a thermoplastic polymer, a lignin, optionally an emulsion stabilizer, and optionally a compatibilizer.

Clause 20. The composition of Clause 19, wherein the lignin comprises a modified lignin.

Clause 21. The composition of Clause 19, wherein the lignin comprises a modified lignin and an unmodified lignin.

Clause 22. The composition of Clause 19, wherein the lignin is present in the polymer particle in an amount of at about 1 wt % to about 90 wt % of the thermoplastic polymer.

Clause 23. The composition of Clause 19, wherein the thermoplastic polymer comprises one or more of: a thermoplastic polyolefin, a polyamide, a polyurethane, a polyacetal, a polycarbonate, polybutylene terephthalate (PBT), polyethylene terephthalate (PET), polyethylene naphthalate (PEN), polytrimethylene terephthalate (PTT), ethylene vinyl acetate copolymer (EVA), polyhexamethylene terephthalate, a polystyrene, a polyvinyl chloride, a polytetrafluoroethene, a polyester (e.g., polylactic acid), a polyether, a polyether sulfone, a polyetherether ketone, a polyacrylate, a polymethacrylate, a polyimide, acrylonitrile butadiene styrene (ABS), a polyphenylene sulfide, a vinyl polymer, a polyarylene ether, a polyarylene sulfide, a polysulfone, a polyether ketone, a polyamide-imide, a polyetherimide, a polyetherester, a copolymer comprising a polyether block and a polyamide block (PEBA or polyether block amide), a functionalized or nonfunctionalized ethylene/vinyl monomer polymer, a functionalized or nonfunctionalized ethylene/ alkyl (meth)acrylate, a functionalized or nonfunctionalized (meth)acrylic acid polymer, a functionalized or nonfunctionalized ethylene/vinyl monomer/alkyl (meth)acrylate terpolymer, an ethylene/vinyl monomer/carbonyl terpolymer, an ethylene/alkyl (meth)acrylate/carbonyl terpolymer, a methylmethacrylate-butadiene-styrene (MBS)-type core-shell polymer, a polystyrene-block-polybutadiene-block-poly(methyl methacrylate) (SBM) block terpolymer, a chlorinated or chlorosulphonated polyethylene, polyvinylidene fluoride (PVDF), a phenolic resin, poly(ethylene/vinyl acetate), a polybutadiene, a polyisoprene, a styrenic block copolymer, a polyacrylonitrile, and a silicone.

Clause 24. The composition of Clause 19, wherein the thermoplastic polymer comprises one or more substituted or unsubstituted $C_2$ to $C_{40}$ alpha olefins.

Clause 25. The composition of Clause 19, wherein the thermoplastic polymer comprises a monomer selected from the group consisting of: polyethylene, polypropylene, ethylene-propylene copolymers, ethylene-propylene-diene copolymers, polybutene, polyisobutylene, polymethylpentene, poly (4-methyl-1-pentene), and any combination thereof.

Clause 26. The composition of Clause 19, wherein the polymer particles have a circularity of about 0.90 to about 1.0.

Clause 27. The composition of Clause 19, wherein the polymer particles have an angle of repose of about 250 to about 45°.

Clause 28. The composition of Clause 19, wherein the polymer particles have a Hausner ratio of about 1.0 to about 1.5.

Clause 29. The composition of Clause 19, wherein the polymer particles have a D10 of about 0.1 μm to about 125 μm, a D50 of about 0.5 μm to about 200 μm, and a D90 of about 3 μm to about 300 μm, wherein D10<D50<D90.

Clause 30. The composition of Clause 19, wherein the polymer particles have a diameter span of about 0.2 to about 10.

Clause 31. The composition of Clause 19, wherein the polymer particles have an aerated density of about 0.5 g/cm³ to about 0.8 g/cm³.

Clause 32. The composition of Clause 19, wherein the polymer particles have a bulk density of about 0.3 g/cm³ to about 0.8 g/cm³.

Clause 33. The composition of Clause 19, wherein the polymer particles have a tapped density of about 0.6 g/cm³ to about 0.9 g/cm³.

Clause 34. The composition of Clause 19, wherein the polymer particles have a BET surface area of about 10 m²/g to about 500 m²/g.

Clause 35. The composition of Clause 19, wherein the polymer particles further comprise an emulsion stabilizer covering at least a portion of a surface of the polymer particles.

Clause 36. The composition of Clause 19, wherein the polymer particles further comprise a nanoparticle emulsion stabilizer embedded in a surface of the polymer particles.

Clause 37. A method comprising: depositing first polymer particles and optionally second polymer particles different than the first particles onto a surface, wherein the first polymer particles have a composition according to one of Clauses 19-36; and once deposited, exposing at least a portion of the first and second particles, when included, to a laser to fuse the first and second particles, when included, and form a consolidated body.

Clause 38. The method of Clause 37, wherein the consolidated body has a void percentage of about 5% or less.

Clause 39. A selective laser sintered article comprising polymer particles sintered together, wherein the polymer particles comprise first polymer particles having a composition according to one of Clauses 19-36.

Clause 40. The method of Clause 39, wherein the selective laser sintered article has a void percentage of about 5% or less.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

EXAMPLES

Commercial Sample (comparative): A commercial example of ULTRASINT®PP powder (available from BASF) were also characterized as a comparative example.

Sample 1 (comparative): To a 500 mL glass reactor 117 g of poly(dimethylsiloxane) (PDMS) PSF-60 000 from Clearco was added. Using approximately 20 g of the measured PDMS, a slurry was made by mixing the PDMS with 0.125 g AEROSIL® RX50 fumed silica. This slurry was added to the glass reactor followed by 50 g of polypropylene homopolymer pellets (Ultra HoPP 20, available from Res-Mart). The reactor was set to 150 RPM with one P4 shaft and heated to 225° C. Once the temperature was reached, the RPM was increased to 500. After 30 min, the mixture was discharged into a metal container containing dry ice. Once the dry ice sublimated, the resultant particles were then washed thrice with heptane and isolated by vacuum filtration. The particles were dried overnight in a vacuum oven at room temperature and then sieved through a 250 μm screen.

The resulting powder will have a final average particle size (D50) of approximately 50 microns and a span of approximately 1.0.

Sample 2 (inventive): Sample 2 was prepared in the manner of Sample 1 with the exception that 0.5 wt % Kraft lignin was added after the addition of the fumed silica.

Sample 3 (inventive): Sample 3 was prepared in the manner of Sample 1 with the exception that 2.5 wt % Kraft lignin was added after the addition of the fumed silica.

Sample 4 (inventive): Sample 4 was prepared in the manner of Sample 1 with the exception that 5 wt % Kraft lignin was added after the addition of the fumed silica. The resulting dried particles were characterized as seen in Table 3.

TABLE 1

Figure 2:
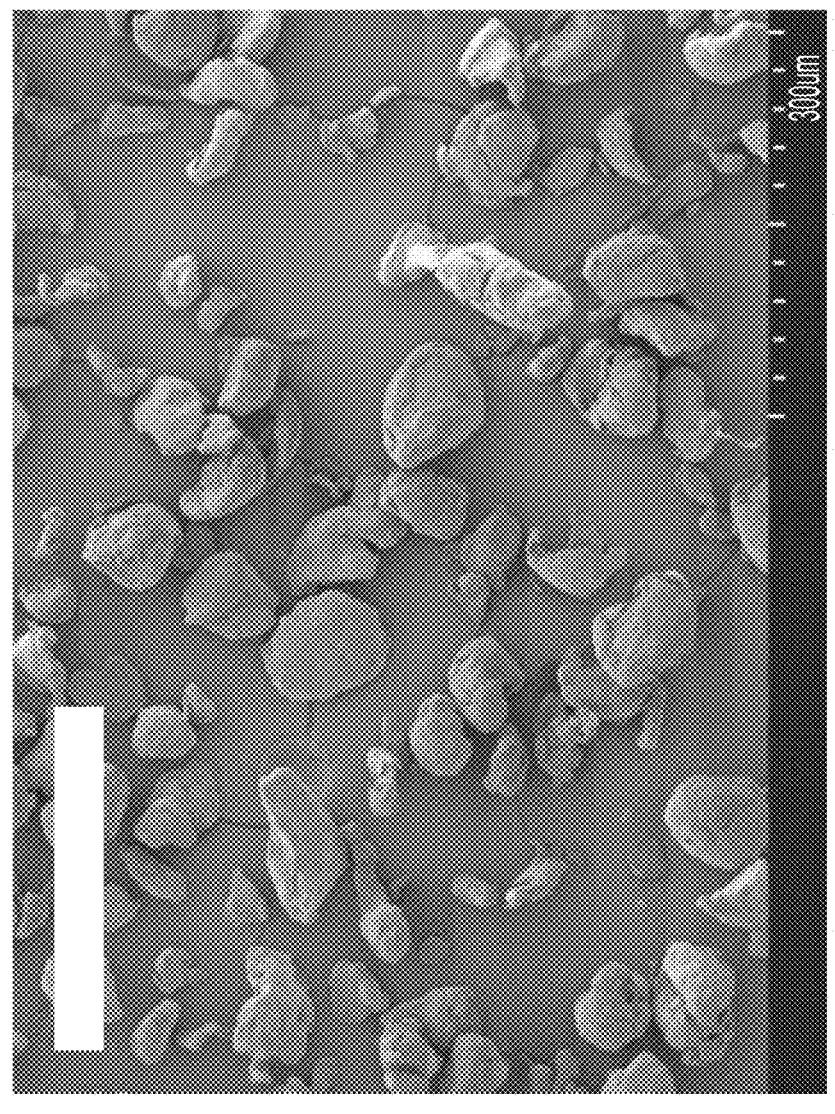
FIGS. 2-3 are scanning electron micrographs of control polymer particles described in the examples.
Figure 3:
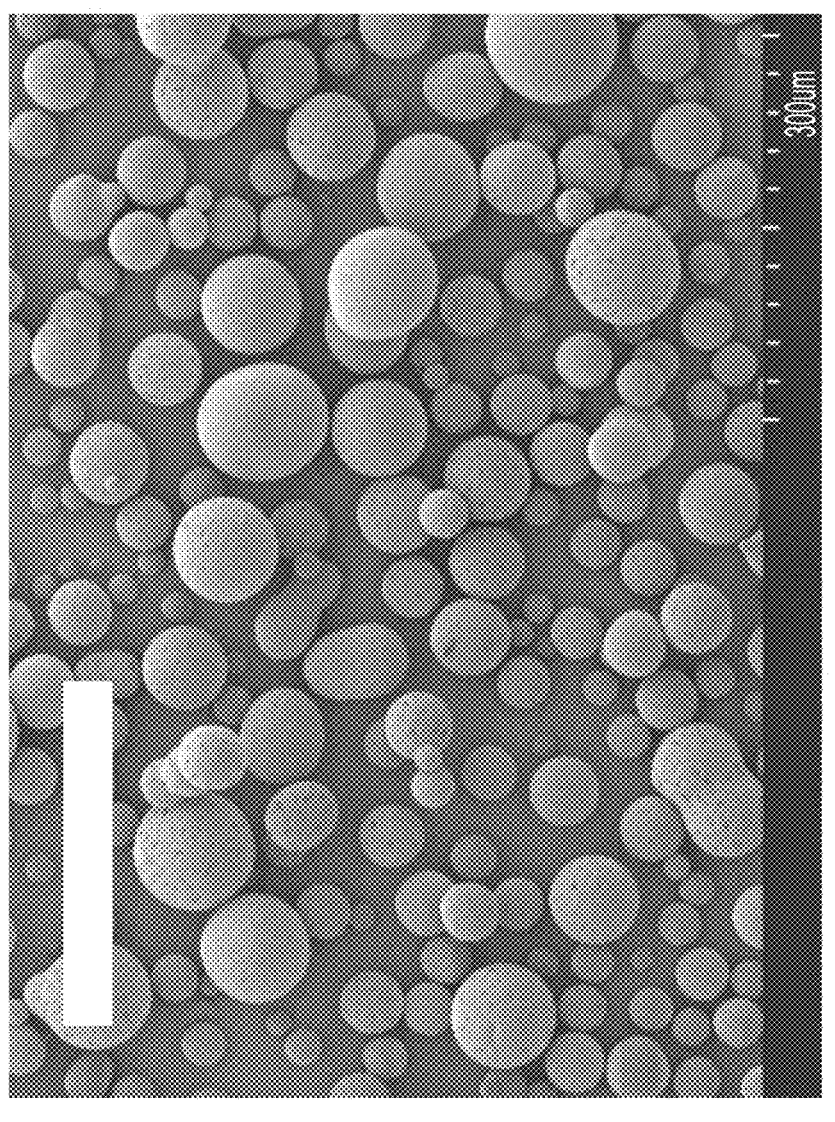
Figure 4:
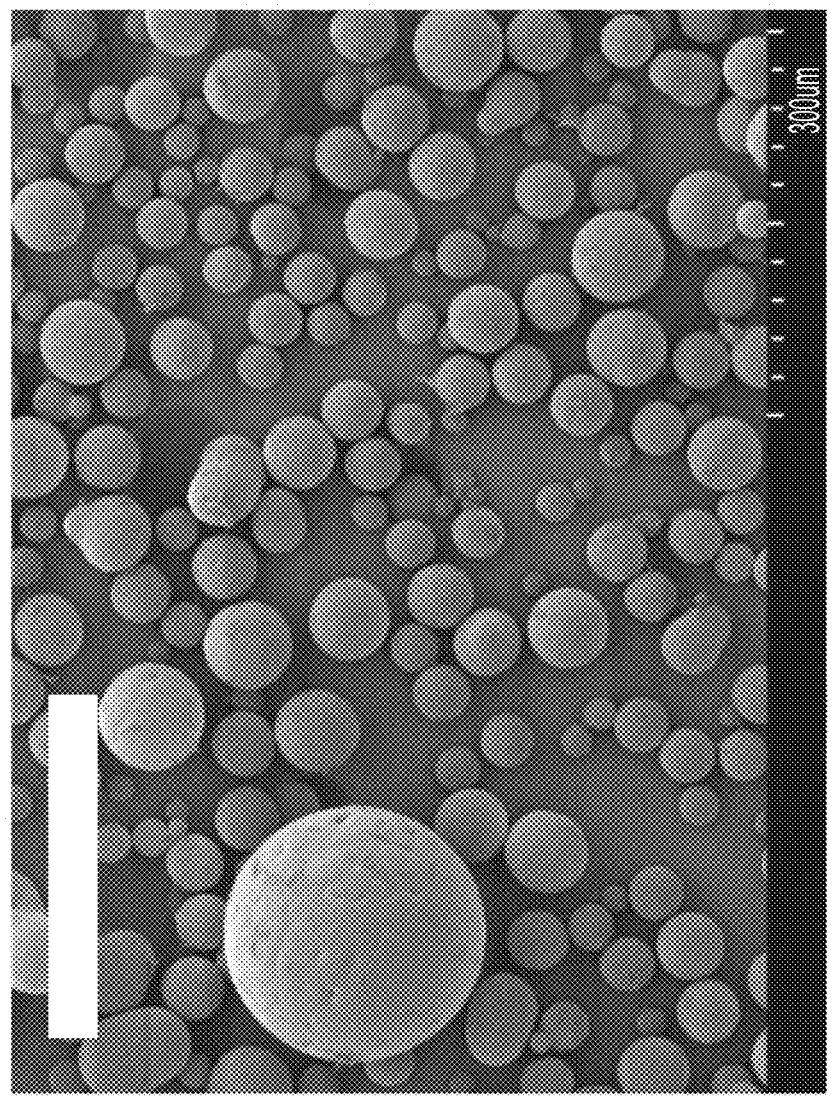
FIGS. 4-6 are scanning electron micrographs of polymer particles described in the examples and according to at least some embodiments of the present disclosure.
Figure 5:
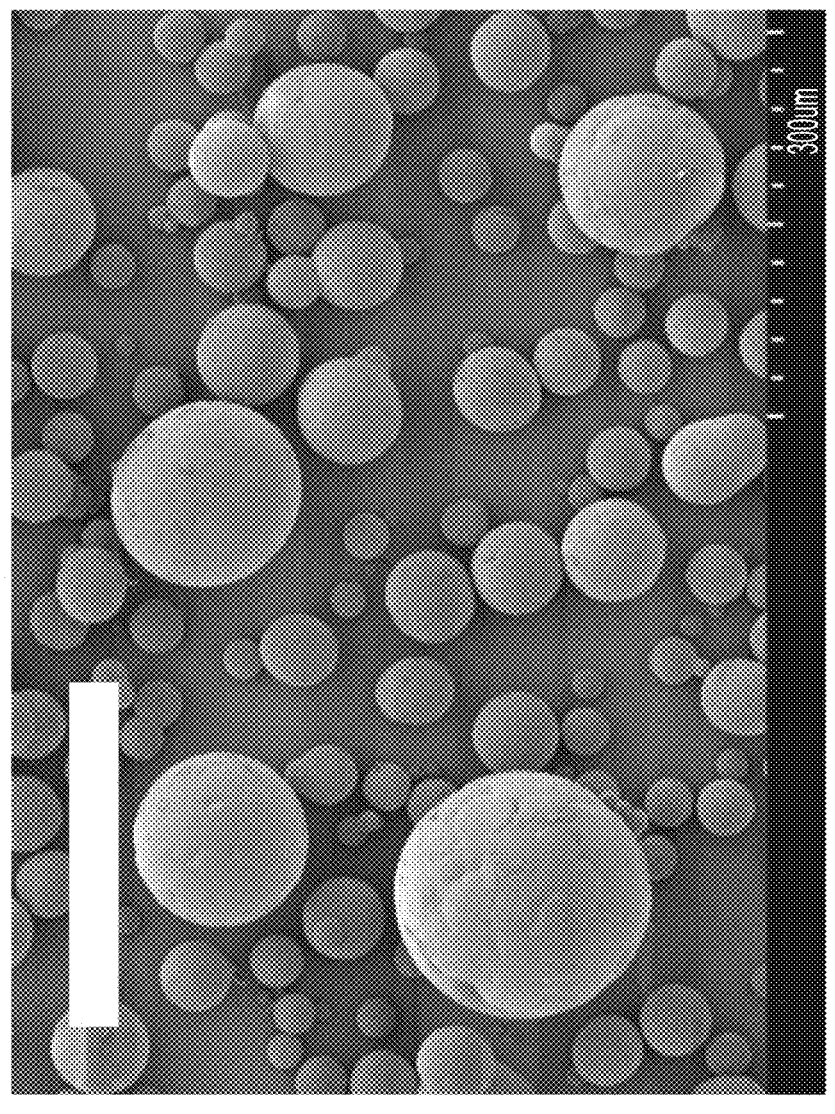
Figure 6:
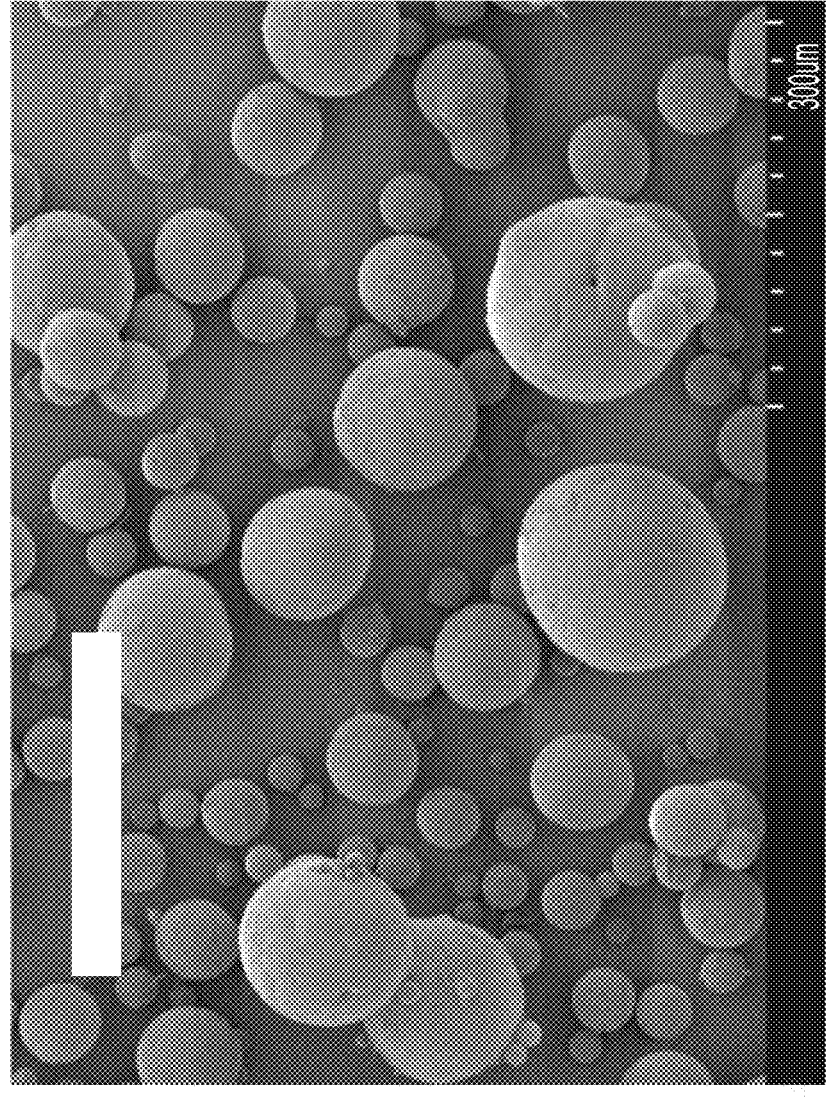

|  | Commercial Sample | Sample 1 | Sample 2 | Sample 3 | Sample 4 |
|---|---|---|---|---|---|
| particle size (microns) (after sieve) | 62.2 | 71.8 | 60.6 | 65.7 | 76.8 |
| span (after sieve) | 1.05 | 1.04 | 1.22 | 1.17 | 1.35 |
| angle of repose (°) | 45.3 | 29.5 | 32.6 | 31.7 | 31.4 |
| SEM Image | FIG. 2 | FIG. 3 | FIG. 4 | FIG. 5 | FIG. 6 |

Baseline 3D printing performance of the dried powders was determined by sintering a single layer of material using a Sharebot SnowWhite SLS printer. The SnowWhite is a professional 3D printer that uses a $CO_2$ laser to sinter thermoplastic powders in a layer by layer fashion. The laser selectively fuses the material by scanning cross-sections of the desired object generated using a computer-aided design (CAD) model.

In this example, a 30 mm×30 mm×0.1 mm square was printed as a preliminary screening object. The sieved particles for each of the samples independently were applied onto an aluminum plate using a bar coater (40 mil gap/approximately 1 mm thick layer of powder). The aluminum plate with particles was placed in the SnowWhite chamber. The motors were disabled since a multilayer object was not printed. The environmental temperature control was enabled. The chamber temperature was set to 115° C. as determined by previous experimentation. Laser rate and laser power were varied to determine optimal print conditions. The chamber and powder bed were cooled to room temperature before the part was removed.

TABLE 2

|  | Commercial Sample* | Sample 1 | Sample 2 | Sample 3 | Sample 4 |
|---|---|---|---|---|---|
| warping (90% laser power) (40,000 laser rate)** | 0.281 | 0.846 | 2.182 | 2.117 | 1.680 |

*The commercial example was prepared with 65% laser power and 40,000 laser rate.
**Laser scan rate is in units of points/second and may be converted to scan speed (units: mm/s) by multiplying by 0.06 mm/point.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A composition comprising:
   polymer particles comprising a thermoplastic polymer, a lignin, an emulsion stabilizer comprising nanoparticles, and optionally a compatibilizer;
      wherein the nanoparticles are embedded in at least a portion of an outer surface of the polymer particles during a melt emulsification process forming the polymer particles, and the nanoparticles comprise metal oxide nanoparticles, carbon black, or any combination thereof; and
      wherein the polymer particles have an aerated density of about 0.5 g/cm$^3$ to about 0.8 g/cm$^3$.

2. The composition of claim 1, wherein the polymer particles have a circularity of about 0.90 to about 1.0.

3. The composition of claim 1, wherein the lignin comprises a modified lignin.

4. The composition of claim 3, wherein the modified lignin comprises lignin molecules grafted with the thermoplastic polymer.

5. The composition of claim 1, wherein the lignin comprises a modified lignin and an unmodified lignin.

6. The composition of claim 1, wherein the lignin is present in the polymer particles in an amount of about 1 wt % to about 90 wt % of the thermoplastic polymer.

7. The composition of claim 1, wherein the polymer particles have an angle of repose of about 25° to about 45°.

8. The composition of claim 1, wherein the polymer particles have a Hausner ratio of about 1.0 to about 1.5.

9. The composition of claim 1, wherein the polymer particles have a D10 of about 0.1 μm to about 125 μm, a D50 of about 0.5 μm to about 200 μm, and a D90 of about 3 μm to about 300 μm, wherein D10<D50<D90.

10. The composition of claim 1, wherein the polymer particles have a diameter span of about 0.2 to about 10.

11. The composition of claim 1, wherein the polymer particles have a tapped density of about 0.6 g/cm$^3$ to about 0.9 g/cm$^3$.

12. The composition of claim 1, wherein the polymer particles have a BET surface area of about 10 m$^2$/g to about 500 m$^2$/g.

13. The composition of claim 1, wherein the nanoparticles comprise silica nanoparticles.

14. A method comprising:
   shearing a mixture comprising: a thermoplastic polymer, a lignin, a carrier fluid, and an emulsion stabilizer comprising nanoparticles at a temperature at or greater than a melting point or softening temperature of the thermoplastic polymer to emulsify a thermoplastic polymer melt in the carrier fluid;
   cooling the mixture to below the melting point or softening temperature to form polymer particles; and
   separating the polymer particles from the carrier fluid, wherein the polymer particles comprise the thermoplastic polymer, the lignin, and the emulsion stabilizer;
      wherein the nanoparticles are embedded in at least a portion of an outer surface of the polymer particles, and the nanoparticles comprise metal oxide nanoparticles, carbon black, or any combination thereof; and
      wherein the polymer particles have an aerated density of about 0.5 g/cm$^3$ to about 0.8 g/cm$^3$.

* * * * *